United States Patent
Chen et al.

(10) Patent No.: US 11,902,809 B2
(45) Date of Patent: Feb. 13, 2024

(54) INFORMATION REPORTING METHOD, DATA TRANSMISSION METHOD, USER EQUIPMENT AND NETWORK SIDE DEVICE

(71) Applicants: China Mobile Communication Co., Ltd Research Institute, Beijing (CN); China Mobile Communications Group Co., Ltd., Beijing (CN)

(72) Inventors: Jingjing Chen, Beijing (CN); Xiaoran Zhang, Beijing (CN); Xueying Hou, Beijing (CN); Nan Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 651 days.

(21) Appl. No.: 17/054,867

(22) PCT Filed: Apr. 9, 2019

(86) PCT No.: PCT/CN2019/081871
§ 371 (c)(1),
(2) Date: Nov. 12, 2020

(87) PCT Pub. No.: WO2019/218803
PCT Pub. Date: Nov. 21, 2019

(65) Prior Publication Data
US 2021/0219158 A1    Jul. 15, 2021

(30) Foreign Application Priority Data

May 17, 2018  (CN) .......................... 201810474321.3
Aug. 8, 2018  (CN) .......................... 201810896769.4

(51) Int. Cl.
*H04W 4/00*    (2018.01)
*H04W 24/10*   (2009.01)
(Continued)

(52) U.S. Cl.
CPC ............... *H04W 24/10* (2013.01); *H04L 1/08* (2013.01); *H04L 5/0048* (2013.01); *H04W 72/23* (2023.01); *H04W 74/0833* (2013.01)

(58) Field of Classification Search
CPC ............... H04W 24/10; H04W 72/042; H04W 74/0833; H04W 72/04; H04W 72/08; H04L 5/0048; H04L 1/08; H04L 5/00
(Continued)

(56) References Cited

U.S. PATENT DOCUMENTS 9,584,288 B2 *  2/2017  Nobukiyo ............... H04L 1/203
9,615,366 B2 *  4/2017  Ohta ..................... H04W 16/04
(Continued)

FOREIGN PATENT DOCUMENTS

CN    101958781 A    1/2011
CN    105451164 A    3/2016
(Continued)

OTHER PUBLICATIONS

"Discussion on DL CE Level Determination Issue in Nb-Iot", 3GPP TSG-RAN WG1 Meeting #92 bis Sanya, China, Apr. 16-20, 2018.
(Continued)

*Primary Examiner* — Marceau Milord
(74) *Attorney, Agent, or Firm* — Price Heneveld LLP

(57) ABSTRACT

An information reporting method, a data transmission method, a user equipment and a network side device are provided. The information reporting method is applied to the user equipment and includes reporting retransmission times information to the network side device.

21 Claims, 2 Drawing Sheets

--- reporting first information to a network side device, the first information indicates a downlink channel quality measure — 501

(51) Int. Cl.
*H04L 1/08* (2006.01)
*H04L 5/00* (2006.01)
*H04W 74/08* (2009.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 10,306,528 | B2* | 5/2019 | Ko | H04W 68/005 |
| 10,568,106 | B2* | 2/2020 | Sandberg | H04L 1/0015 |
| 11,277,779 | B2* | 3/2022 | Kim | H04W 68/005 |
| 11,558,855 | B2* | 1/2023 | Dinan | H04L 5/0053 |
| 2013/0072246 | A1* | 3/2013 | Nobukiyo | H04L 1/0009 |
| | | | | 455/512 |
| 2014/0219184 | A1 | 8/2014 | Makharia et al. | |
| 2015/0003376 | A1* | 1/2015 | Pang | H04L 1/1887 |
| | | | | 370/329 |
| 2015/0049703 | A1* | 2/2015 | Nobukiyo | H04L 1/0009 |
| | | | | 370/329 |
| 2017/0245158 | A1 | 8/2017 | Xiao et al. | |
| 2017/0338877 | A1 | 11/2017 | Yum et al. | |
| 2019/0116599 | A1* | 4/2019 | Xue | H04L 5/0035 |
| 2019/0124655 | A1* | 4/2019 | Liu | H04L 5/003 |

FOREIGN PATENT DOCUMENTS

| | | | | |
|---|---|---|---|---|
| CN | 105722105 | A | 6/2016 | |
| CN | 105900478 | A | 8/2016 | |
| CN | 105992379 | A | 10/2016 | |
| CN | 107708178 | A | 2/2018 | |
| CN | 107995595 | A | 5/2018 | |
| WO | 2008114198 | A2 | 9/2008 | |
| WO | 2013146273 | A1 | 10/2013 | |
| WO | WO-2015115579 | A1 * | 8/2015 | H04L 5/0053 |
| WO | 2018063086 | A9 | 4/2018 | |
| WO | 2018082023 | A1 | 5/2018 | |

OTHER PUBLICATIONS

Interdigital, "Remaining Issues on M-PDCCH", 3GPP TSG RAN WG1 Meeting #83, R1-157430, Anaheim, USA, Nov. 15-22, 2015.
Ericcson, "NB-Iot downlink channel quality determination and report", 3GPP TSG-RAN WG4 Meeting #87, R4-1806754, Busan, Korea (Republic of), May 21-25, 2018.

* cited by examiner

INFORMATION REPORTING METHOD, DATA TRANSMISSION METHOD, USER EQUIPMENT AND NETWORK SIDE DEVICE

CROSS-REFERENCE TO RELATED APPLICATION

The present application is the U.S. national phase of PCT Application No. PCT/CN2019/081871 filed on Apr. 9, 2019, which claims a priority of the Chinese patent application No. 201810474321.3 filed on May 17, 2018 and a priority of the Chinese patent application No. 201810896769.4 filed on Aug. 8, 2018, which is incorporated herein by reference in its entirety.

TECHNICAL FIELD

The present disclosure relates to the field of communication technology, in particular to an information reporting method, a data transmission method, a user equipment and a network side device.

BACKGROUND

In the Narrow Band Internet of Things (NB-IOT) system, a user equipment (UE) determines the coverage area according to the Reference Signal Receiving Power (RSRP) (there are three kinds of coverage areas: a normal coverage, an extended coverage and a limit coverage), and determine the times of retransmission (Msg1) for sending uplink data according to the corresponding coverage. The network side device acquires the coverage area of the UE according to the times of retransmission used by the UE to send uplink data, and configures the corresponding times of retransmission to send downlink data (Msg2).

Since RSRP cannot reflect the interference situation of the UE, the times of retransmission may not satisfy the requirement of correct data transmission. For example, the UE determines that the times of uplink retransmission is 64 according to the RSRP, and the network side device will also use the times of retransmission to perform downlink data transmission accordingly (for example, the times of retransmission=64). However, if the UE suffers from severe interference, 64 times of retransmission may cause the UE to fail to demodulate the downlink data correctly, which affects the performance of the communication system.

SUMMARY

The technical problem to be solved by the present disclosure is to provide an information reporting method, a data transmission method, a UE, and a network side equipment. The UE reports retransmission times information to the network side equipment, so that the network side equipment can use reasonable times of retransmission to send downlink data.

In one aspect, the present disclosure provides in some embodiments an information reporting method applied to a UE, which includes reporting retransmission times information to a network side device.

In some embodiments of the present disclosure, the retransmission times information is retransmission times information of downlink data.

In some embodiments of the present disclosure, before the reporting retransmission times information to a network side device, the method further includes: determining the retransmission time information required to complete demodulation of downlink data according to a downlink channel quality; or determining the retransmission time information according to a bit error rate threshold for demodulation of a physical downlink control channel.

In some embodiments of the present disclosure, the reporting retransmission times information to the network side device comprises at least one of: determining bit information correspond to the retransmission times information according to an acquired mapping relationship between the retransmission times information and the bit information, and reporting the bit information to the network side device; reporting the retransmission times information to the network side device through a scrambling method or a modulation and coding method used for sending uplink data; reporting the retransmission times information required to complete the demodulation of downlink data to the network side device.

In some embodiments of the present disclosure, the retransmission times information includes at least one of: times of retransmission required by the UE to complete the demodulation of downlink data demodulation; a multiple relationship between times of retransmission required by the UE to complete the demodulation of downlink data and times of retransmission used to send uplink data; an amount relationship between the times of retransmission required by the UE to complete the demodulation of downlink data and the times of retransmission used to send the uplink data; a range of the times of retransmission required by the UE to complete the demodulation of downlink data; an actual coverage area determined by the UE according to a downlink channel quality.

In some embodiments of the present disclosure, the amount relationship includes one of: the times of retransmission required by the UE to complete the demodulation of downlink data is less than the times of retransmission used to send uplink data, and the times of retransmission required by the UE to complete the demodulation of downlink data belongs to a coverage area determined according to a Reference Signal Receiving Power (RSRP); the times of retransmission required by the UE to complete the demodulation of downlink data is greater than the times of retransmission used to send uplink data, and the times of retransmission required by the UE to complete the demodulation of downlink data belongs to the coverage area determined according to RSRP; the times of retransmission required by the UE to complete the demodulation of downlink data is greater than the times of retransmission used to send uplink data, and the times of retransmission required by the UE to complete the demodulation of downlink data is beyond the coverage area determined according to RSRP.

In some embodiments of the present disclosure, the downlink channel quality is determined by a signal to interference plus noise ratio (SINR).

In another aspect, an embodiment of the present disclosure provides a data transmission method applied to a network side device, includes receiving retransmission times information reported by a UE.

In some embodiments of the present disclosure, the retransmission times information is retransmission times information of downlink data.

In some embodiments of the present disclosure, after the receiving retransmission times information reported by a UE, the method further includes: performing downlink data transmission according to retransmission times information.

In some embodiments of the present disclosure, before the receiving the retransmission times information reported by a UE, the method further includes: sending a mapping relationship between the retransmission times information and bit information to the UE.

In some embodiments of the present disclosure, the sending the mapping relationship between the retransmission times information and bit information to the UE includes: sending the mapping relationship between the retransmission times information and the bit information to the UE through a system message; or sending the mapping relationship between the retransmission times information and the bit information to the UE through a radio resource control (RRC) signaling.

In another aspect, an embodiment of present disclosure provides a UE including a processor and a transceiver, the transceiver is configured to report retransmission times information to a network side device.

In some embodiments of the present disclosure, the retransmission times information is retransmission times information of downlink data.

In some embodiments of the present disclosure, the processor is configured to: determine the retransmission time information required to complete demodulation of downlink data according to a downlink channel quality; or determine the retransmission time information according to a bit error rate threshold for demodulation of a physical downlink control channel.

In some embodiments of the present disclosure, the processor is configured to determine bit information correspond to the retransmission times information according to an acquired mapping relationship between the retransmission times information and the bit information, and the transceiver is configured to at least one of: report the bit information to the network side device; report the retransmission times information to the network side device through a scrambling method or a modulation and coding method used for sending uplink data; report the retransmission times information required to complete the demodulation of downlink data to the network side device.

In some embodiments of the present disclosure, the retransmission times information includes at least one of: times of retransmission required by the UE to complete the demodulation of downlink data demodulation; a multiple relationship between times of retransmission required by the UE to complete the demodulation of downlink data and times of retransmission used to send uplink data; an amount relationship between the times of retransmission required by the UE to complete the demodulation of downlink data and the times of retransmission used to send the uplink data; a range of the times of retransmission required by the UE to complete the demodulation of downlink data; an actual coverage area determined by the UE according to a downlink channel quality.

In some embodiments of the present disclosure, the amount relationship includes one of: the times of retransmission required by the UE to complete the demodulation of downlink data is less than the times of retransmission used to send uplink data, and the times of retransmission required by the UE to complete the demodulation of downlink data belongs to a coverage area determined according to a Reference Signal Receiving Power (RSRP); the times of retransmission required by the UE to complete the demodulation of downlink data is greater than the times of retransmission used to send uplink data, and the times of retransmission required by the UE to complete the demodulation of downlink data belongs to the coverage area determined according to RSRP; the times of retransmission required by the UE to complete the demodulation of downlink data is greater than the times of retransmission used to send uplink data, and the times of retransmission required by the UE to complete the demodulation of downlink data is beyond the coverage area determined according to RSRP.

In some embodiments of the present disclosure, the downlink channel quality is determined by a signal to interference plus noise ratio (SINR).

In another aspect, an embodiment of present disclosure provides a network side device including a processor and a transceiver, wherein the transceiver is configured to receive retransmission times information reported by a UE.

In some embodiments of the present disclosure, the retransmission times information is retransmission times information of downlink data.

In some embodiments of the present disclosure, the transceiver is further configured to perform downlink data transmission according to the retransmission times information.

In some embodiments of the present disclosure, the transceiver is further configured to send a mapping relationship between the retransmission times information and bit information to the UE.

In some embodiments of the present disclosure, the transceiver is configured to: send the mapping relationship between the retransmission times information and the bit information to the UE through a system message; or send the mapping relationship between the retransmission times information and the bit information to the UE through a radio resource control (RRC) signaling.

In another aspect, an embodiment of the present disclosure provides an information reporting method applied to a UE, includes: reporting first information to a network side device, wherein the first information indicates a downlink channel quality measure.

In some embodiments of the present disclosure, the first information includes N information units, wherein a first information unit represents no measurement report; a second information unit to an Nth information unit represent second information, and N is an integer greater than 1.

In some embodiments of the present disclosure, the first information includes at least one of: times of repetition of a physical downlink control channel (PDCCH); a relationship between the times of repetition of PDCCH and times of repetition of NPRACH for each random access attempt; a relationship between the times of repetition of PDCCH and a maximum times of repetition for random access to NPDCCH; a range of times of repetition of PDCCH; a coverage enhancement level.

In some embodiments of the present disclosure, before the reporting first information to a network side device, the method further includes: determining repetition times information of PDCCH transmission according to a SINR of a downlink channel; or determining the repetition times information according to a bit error rate of PDCCH.

In some embodiments of the present disclosure, the reporting first information to a network side device includes at least one of: reporting downlink channel quality information to the network side device by using a decoding method of uplink data; reporting the downlink channel quality information to the network side device by using a scrambling method and/or a modulation and coding method and/or a time-frequency resource location used for sending uplink data; reporting the downlink channel quality information to the network side device, and the downlink channel quality information being characterized by a bit field; reporting the downlink channel quality information to the network side device by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and reporting the downlink channel quality information to the network side device by using the third information and fifth information, wherein the third information indicates a part of the downlink channel quality information by bits, and the fifth information implicitly indicates the remaining part of the downlink channel quality information by using a decoding method of the uplink data.

In some embodiments of the present disclosure, before the reporting first information to a network side device, the method further includes: acquiring a mapping relationship between downlink channel quality information and bit information issued by the network; or acquiring a mapping relationship between downlink channel quality information and bit information specified in a protocol; or determining a mapping relationship between downlink channel quality information and bit information.

In some embodiments of the present disclosure, the times of repetition of PDCCH includes one of: times of repetition of PDCCH transmission; a maximum times of repetition of PDCCH transmission; a minimum times of repetition of PDCCH transmission.

In some embodiments of the present disclosure, the first information is determined by a first constraint relationship between times of repetition of NPRACH for each random access attempt and a first value; or by a second constraint relationship between maximum times of repetition for random access to NPDCCH and a second value; the first constraint relationship includes at least one of: multiplying by the first value; dividing by the first value; adding the first value; subtracting the first value, the second constraint relationship includes at least one of: multiplying by the second value; dividing by the second value; adding the second value; subtracting the second value, wherein the first value and the second value are integers.

In some embodiments of the present disclosure, the relationship between the times of repetition of PDCCH and the times of repetition of NPRACH for each random access attempt includes at least one of: a difference relationship between the times of repetition of PDCCH and the times of repetition of NPRACH for each random access attempt; a multiple relationship between the times of repetition of PDCCH and the times of repetition of NPRACH for each random access attempt.

In some embodiments of the present disclosure, the difference relationship between the times of repetition of PDCCH and the times of repetition of NPRACH for each random access attempt includes: the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt; or the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

In some embodiments of the present disclosure, the multiple relationship between the times of repetition of PDCCH and the times of repetition of NPRACH for each random access attempt includes: the multiple relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is the times of repetition of NPRACH for each random access attempt multiplied by a third value, the third indication information indicates that the times of repetition of PDCCH is the times of repetition of NPRACH for each random access attempt multiplied by a fourth value, the third value is less than the fourth value, and the third and fourth values are integers; or the multiple relationship between the times of repetition of PDCCH and the time of repetition of NPRACH for each random access attempt includes first indication information, second indication information, and third indication information, the first indication information indicates the times of repetition of PDCCH and the times of repetition of NPRACH for each random access attempt is the same, the second indication information indicates that the times of repetition of PDCCH is the times of repetition of NPRACH for each random access attempt multiplied by a fifth value, the third indication information indicates that the times of repetition of the physical downlink control channel is the times of repetition of NPRACH for each random access attempt divided by a sixth value, and the fifth value and the sixth value are integers.

In some embodiments of the present disclosure, the relationship between the times of repetition of PDCCH and the maximum times of repetition for random access to NPDCCH includes at least one of: a difference relationship between the times of repetition of PDCCH and the maximum times of repetition for random access to NPDCCH; a multiple relationship between the times of repetition of PDCCH and the maximum times of repetition for random access to NPDCCH.

In some embodiments of the present disclosure, the difference relationship between the times of repetition of PDCCH and the maximum times of repetition for random access to NPDCCH includes: the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is less than the maximum times of repetition for random access to NPDCCH; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is less than the maximum times of repetition for random access to NPDCCH, and the third indication information indicates that the times of repetition of PDCCH is less than the times of repetition indicated in the second indication information; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is greater than the times of repetition indicated in the second indication information.

In some embodiments of the present disclosure, the multiple relationship between the times of repetition of PDCCH and the maximum times of repetition for random access to NPDCCH includes: the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to NPDCCH divided by a seventh value, the third indication information indicates that the times of repetition of PDCCH is the maximum times of repetition for random access to NPDCCH divided by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to the NPDCCH multiplied by a seventh value, the third indication information indicates that the times of repetition of PDCCH is the maximum times of repetition for random access to the NPDCCH multiplied by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to the NPDCCH is the same, the second indication information indicates that the times of repetition of PDCCH is the maximum times of repetition for random access to the NPDCCH multiplied by a ninth value, the third indication information indicates that the times of repetition of PDCCH is the maximum times of repetition for random access to the NPDCCH divided by the tenth value, and the ninth value and the tenth value are integers.

In some embodiments of the present disclosure, the maximum times of repetition for random access to NPDCCH is a maximum times of repetition of a random access response and/or MSG3 retransmission and/or MSG4 NPDCCH common search space.

In another aspect, an embodiment of the present disclosure provides a data transmission method applied to a network side device, includes: receiving first information reported by a UE, where the first information indicates a downlink channel quality measure.

In some embodiments of the present disclosure, the first information includes N information units, wherein a first information unit represents no measurement report; a second information unit to an Nth information unit represent second information, and N is an integer greater than 1.

In some embodiments of the present disclosure, the first information includes at least one of: times of repetition of a physical downlink control channel (PDCCH); a relationship between the times of repetition of PDCCH and times of repetition of NPRACH for each random access attempt; a relationship between the times of repetition of PDCCH and a maximum times of repetition for random access to NPDCCH; a range of times of repetition of PDCCH; a coverage enhancement level.

In some embodiments of the present disclosure, after the receiving first information reported by a UE, the method further includes: performing PCDDH transmission.

In some embodiments of the present disclosure, the receiving first information reported by a UE comprises at least one of: receiving downlink channel quality information reported by the UE by using a decoding method of uplink data; receiving the downlink channel quality information reported by the UE by using a scrambling method and/or a modulation and coding method and/or a time-frequency resource location used for sending uplink data; receiving the downlink channel quality information reported by the UE, and the downlink channel quality information being characterized by a bit field; receiving the downlink channel quality information reported by the UE by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and receiving the downlink channel quality information reported by the UE by using the third information and fifth information, wherein the third information indicates a part of the downlink channel quality information by bits, and the fifth information implicitly indicates the remaining part of the downlink channel quality information by using a decoding method of the uplink data.

In some embodiments of the present disclosure, before the receiving first information reported by a UE, the method further includes: issuing a mapping relationship between downlink channel quality information and bit information to the UE.

In some embodiments of the present disclosure, the times of repetition of PDCCH includes one of: times of repetition of PDCCH transmission; a maximum times of repetition of PDCCH transmission; a minimum times of repetition of PDCCH transmission.

In some embodiments of the present disclosure, the first information is determined by a first constraint relationship between times of repetition of NPRACH for each random access attempt and a first value; or by a second constraint relationship between maximum times of repetition for random access to NPDCCH and a second value; the first constraint relationship includes at least one of: multiplying by the first value; dividing by the first value; adding the first value; subtracting the first value, the second constraint relationship includes at least one of: multiplying by the second value; dividing by the second value; adding the second value; subtracting the second value, wherein the first value and the second value are integers.

In some embodiments of the present disclosure, the relationship between the times of repetition of PDCCH and the times of repetition of NPRACH for each random access attempt includes at least one of: a difference relationship between the times of repetition of PDCCH and the times of repetition of NPRACH for each random access attempt; a multiple relationship between the times of repetition of PDCCH and the times of repetition of NPRACH for each random access attempt.

In some embodiments of the present disclosure, the difference relationship between the times of repetition of PDCCH and the times of repetition of NPRACH for each random access attempt includes: the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt; or the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

In some embodiments of the present disclosure, the multiple relationship between the times of repetition of PDCCH and the times of repetition of NPRACH for each random access attempt includes: the multiple relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is the times of repetition of NPRACH for each random access attempt multiplied by a third value, the third indication information indicates that the times of repetition of PDCCH is the times of repetition of NPRACH for each random access attempt multiplied by a fourth value, the third value is less than the fourth value, and the third and fourth values are integers; or the multiple relationship between the times of repetition of PDCCH and the time of repetition of NPRACH for each random access attempt includes first indication information, second indication information, and third indication information, the first indication information indicates the times of repetition of PDCCH and the times of repetition of NPRACH for each random access attempt is the same, the second indication information indicates that the times of repetition of PDCCH is the times of repetition of NPRACH for each random access attempt multiplied by a fifth value, the third indication information indicates that the times of repetition of the physical downlink control channel is the times of repetition of NPRACH for each random access attempt divided by a sixth value, and the fifth value and the sixth value are integers.

In some embodiments of the present disclosure, the relationship between the times of repetition of PDCCH and the maximum times of repetition for random access to NPDCCH includes at least one of: a difference relationship between the times of repetition of PDCCH and the maximum times of repetition for random access to NPDCCH; a multiple relationship between the times of repetition of PDCCH and the maximum times of repetition for random access to NPDCCH.

In some embodiments of the present disclosure, the difference relationship between the times of repetition of PDCCH and the maximum times of repetition for random access to NPDCCH includes: the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is less than the maximum times of repetition for random access to NPDCCH; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is less than the maximum times of repetition for random access to NPDCCH, and the third indication information indicates that the times of repetition of PDCCH is less than the times of repetition indicated in the second indication information; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is greater than the times of repetition indicated in the second indication information.

In some embodiments of the present disclosure, the multiple relationship between the times of repetition of PDCCH and the maximum times of repetition for random access to NPDCCH includes: the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to NPDCCH divided by a seventh value, the third indication information indicates that the times of repetition of PDCCH is the maximum times of repetition for random access to NPDCCH divided by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to the NPDCCH multiplied by a seventh value, the third indication information indicates that the times of repetition of PDCCH is the maximum times of repetition for random access to the NPDCCH multiplied by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to the NPDCCH is the same, the second indication information indicates that the times of repetition of PDCCH is the maximum times of repetition for random access to the NPDCCH multiplied by a ninth value, the third indication information indicates that the times of repetition of PDCCH is the maximum times of repetition for random access to the NPDCCH divided by the tenth value, and the ninth value and the tenth value are integers.

In some embodiments of the present disclosure, the maximum times of repetition for random access to NPDCCH is: a maximum times of repetition of a random access response and/or MSG3 retransmission and/or MSG4 NPDCCH common search space.

In another aspect, an embodiment of the present disclosure provides a UE including a processor and a transceiver, the transceiver is configured to report first information to a network side device, the first information indicates a downlink channel quality measure.

In some embodiments of the present disclosure, the first information includes N information units, wherein a first information unit represents no measurement report; a second information unit to an Nth information unit represent second information, and N is an integer greater than 1.

In some embodiments of the present disclosure, the first information includes at least one of: times of repetition of a physical downlink control channel (PDCCH); a relationship between the times of repetition of PDCCH and times of repetition of NPRACH for each random access attempt; a relationship between the times of repetition of PDCCH and a maximum times of repetition for random access to NPDCCH; a range of times of repetition of PDCCH; a coverage enhancement level.

In some embodiments of the present disclosure, the processor is configured to: determine repetition times information of PDCCH transmission according to a SINR of a downlink channel; or determine the repetition times information according to a bit error rate of PDCCH.

In some embodiments of the present disclosure, the processor is configured to implement at least one of: reporting downlink channel quality information to the network side device by using a decoding method of uplink data; reporting the downlink channel quality information to the network side device by using a scrambling method and/or a modulation and coding method and/or a time-frequency resource location used for sending uplink data; reporting the downlink channel quality information to the network side device, and the downlink channel quality information being characterized by a bit field; reporting the downlink channel quality information to the network side device by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and reporting the downlink channel quality information to the network side device by using the third information and fifth information, wherein the third information indicates a part of the downlink channel quality information by bits, and the fifth information implicitly indicates the remaining part of the downlink channel quality information by using a decoding method of the uplink data.

In some embodiments of the present disclosure, the processor is further configured to: acquire a mapping relationship between downlink channel quality information and bit information issued by the network; or acquire a mapping relationship between downlink channel quality information and bit information specified in a protocol; or determine a mapping relationship between downlink channel quality information and bit information.

In some embodiments of the present disclosure, the times of repetition of PDCCH includes one of: times of repetition of PDCCH transmission; a maximum times of repetition of PDCCH transmission; a minimum times of repetition of PDCCH transmission.

In some embodiments of the present disclosure, the first information is determined by a first constraint relationship between times of repetition of NPRACH for each random access attempt and a first value; or by a second constraint relationship between maximum times of repetition for random access to NPDCCH and a second value; the first constraint relationship includes at least one of: multiplying by the first value; dividing by the first value; adding the first value; subtracting the first value, the second constraint relationship includes at least one of: multiplying by the second value; dividing by the second value; adding the second value; subtracting the second value, wherein the first value and the second value are integers.

In some embodiments of the present disclosure, the relationship between the times of repetition of PDCCH and the times of repetition of NPRACH for each random access attempt includes at least one of: a difference relationship between the times of repetition of PDCCH and the times of repetition of NPRACH for each random access attempt; a multiple relationship between the times of repetition of PDCCH and the times of repetition of NPRACH for each random access attempt.

In some embodiments of the present disclosure, the difference relationship between the times of repetition of PDCCH and the times of repetition of NPRACH for each random access attempt includes: the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt; or the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

In some embodiments of the present disclosure, the multiple relationship between the times of repetition of PDCCH and the times of repetition of NPRACH for each random access attempt includes: the multiple relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is the times of repetition of NPRACH for each random access attempt multiplied by a third value, the third indication information indicates that the times of repetition of PDCCH is the times of repetition of NPRACH for each random access attempt multiplied by a fourth value, the third value is less than the fourth value, and the third and fourth values are integers; or the multiple relationship between the times of repetition of PDCCH and the time of repetition of NPRACH for each random access attempt includes first indication information, second indication information, and third indication information, the first indication information indicates the times of repetition of PDCCH and the times of repetition of NPRACH for each random access attempt is the same, the second indication information indicates that the times of repetition of PDCCH is the times of repetition of NPRACH for each random access attempt multiplied by a fifth value, the third indication information indicates that the times of repetition of the physical downlink control channel is the times of repetition of NPRACH for each random access attempt divided by a sixth value, and the fifth value and the sixth value are integers.

In some embodiments of the present disclosure, the relationship between the times of repetition of PDCCH and the maximum times of repetition for random access to NPDCCH includes at least one of: a difference relationship between the times of repetition of PDCCH and the maximum times of repetition for random access to NPDCCH; a multiple relationship between the times of repetition of PDCCH and the maximum times of repetition for random access to NPDCCH.

In some embodiments of the present disclosure, the difference relationship between the times of repetition of PDCCH and the maximum times of repetition for random access to NPDCCH includes: the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is less than the maximum times of repetition for random access to NPDCCH; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is less than the maximum times of repetition for random access to NPDCCH, and the third indication information indicates that the times of repetition of PDCCH is less than the times of repetition indicated in the second indication information; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is greater than the times of repetition indicated in the second indication information.

In some embodiments of the present disclosure, the multiple relationship between the times of repetition of PDCCH and the maximum times of repetition for random access to NPDCCH includes: the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to NPDCCH divided by a seventh value, the third indication information indicates that the times of repetition of PDCCH is the maximum times of repetition for random access to NPDCCH divided by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to the NPDCCH multiplied by a seventh value, the third indication information indicates that the times of repetition of PDCCH is the maximum times of repetition for random access to the NPDCCH multiplied by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to the NPDCCH is the same, the second indication information indicates that the times of repetition of PDCCH is the maximum times of repetition for random access to the NPDCCH multiplied by a ninth value, the third indication information indicates that the times of repetition of PDCCH is the maximum times of repetition for random access to the NPDCCH divided by the tenth value, and the ninth value and the tenth value are integers.

In some embodiments of the present disclosure, the maximum times of repetition for random access to NPDCCH is a maximum times of repetition of a random access response and/or MSG3 retransmission and/or MSG4 NPDCCH common search space.

In another aspect, an embodiment of the present disclosure provides a network side device including a processor and a transceiver, the transceiver is configured to receive first information reported by a UE, where the first information indicates a downlink channel quality measure.

In some embodiments of the present disclosure, the first information includes N information units, wherein a first information unit represents no measurement report; a second information unit to an Nth information unit represent second information, and N is an integer greater than 1.

In some embodiments of the present disclosure, the first information includes at least one of: times of repetition of a physical downlink control channel (PDCCH); a relationship between the times of repetition of PDCCH and times of repetition of NPRACH for each random access attempt; a relationship between the times of repetition of PDCCH and a maximum times of repetition for random access to NPDCCH; a range of times of repetition of PDCCH; a coverage enhancement level.

In some embodiments of the present disclosure, the transceiver is further configured to perform PCDDH transmission.

In some embodiments of the present disclosure, the transceiver is configured to implement at least one of: receiving downlink channel quality information reported by the UE by using a decoding method of uplink data; receiving the downlink channel quality information reported by the UE by using a scrambling method and/or a modulation and coding method and/or a time-frequency resource location used for sending uplink data; receiving the downlink channel quality information reported by the UE, and the downlink channel quality information being characterized by a bit field; receiving the downlink channel quality information reported by the UE by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and receiving the downlink channel quality information reported by the UE by using the third information and fifth information, wherein the third information indicates a part of the downlink channel quality information by bits, and the fifth information implicitly indicates the remaining part of the downlink channel quality information by using a decoding method of the uplink data.

In some embodiments of the present disclosure, the transceiver is further configured to issue a mapping relationship between downlink channel quality information and bit information to the UE.

In some embodiments of the present disclosure, the times of repetition of PDCCH includes one of: times of repetition of PDCCH transmission; a maximum times of repetition of PDCCH transmission; a minimum times of repetition of PDCCH transmission.

In some embodiments of the present disclosure, the first information is determined by a first constraint relationship between times of repetition of NPRACH for each random access attempt and a first value; or by a second constraint relationship between maximum times of repetition for random access to NPDCCH and a second value; the first constraint relationship includes at least one of: multiplying by the first value; dividing by the first value; adding the first value; subtracting the first value, the second constraint relationship includes at least one of: multiplying by the second value; dividing by the second value; adding the second value; subtracting the second value, wherein the first value and the second value are integers.

In some embodiments of the present disclosure, the relationship between the times of repetition of PDCCH and the times of repetition of NPRACH for each random access attempt includes at least one of: a difference relationship between the times of repetition of PDCCH and the times of repetition of NPRACH for each random access attempt; a multiple relationship between the times of repetition of PDCCH and the times of repetition of NPRACH for each random access attempt.

In some embodiments of the present disclosure, the difference relationship between the times of repetition of PDCCH and the times of repetition of NPRACH for each random access attempt includes: the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt; or the difference relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

In some embodiments of the present disclosure, the multiple relationship between the times of repetition of PDCCH and the times of repetition of NPRACH for each random access attempt includes: the multiple relationship between the times of repetition of PDCCH and the times of repetition of NPRACH for each random access attempt includes first indication information, second indication information, and third indication information, the first indication information indicates the times of repetition of PDCCH is the same as the times of repetition of NPRACH for each random access attempt, the second indication information indicates that the times of repetition of PDCCH is the times of repetition of NPRACH for each random access attempt multiplied by a third value, the third indication information indicates that the times of repetition of PDCCH is the times of repetition of NPRACH for each random access attempt multiplied by a fourth value, the third value is less than the fourth value, and the third and fourth values are integers; or the multiple relationship between the times of repetition of PDCCH and the time of repetition of NPRACH for each random access attempt includes first indication information, second indication information, and third indication information, the first indication information indicates the times of repetition of PDCCH and the times of repetition of NPRACH for each random access attempt is the same, the second indication information indicates that the times of repetition of PDCCH is the times of repetition of NPRACH for each random access attempt multiplied by a fifth value, the third indication information indicates that the times of repetition of the physical downlink control channel is the times of repetition of NPRACH for each random access attempt divided by a sixth value, and the fifth value and the sixth value are integers.

In some embodiments of the present disclosure, the relationship between the times of repetition of PDCCH and the maximum times of repetition for random access to NPDCCH includes at least one of: a difference relationship between the times of repetition of PDCCH and the maximum times of repetition for random access to NPDCCH; a multiple relationship between the times of repetition of PDCCH and the maximum times of repetition for random access to NPDCCH.

In some embodiments of the present disclosure, the difference relationship between the times of repetition of PDCCH and the maximum times of repetition for random access to NPDCCH includes: the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is less than the maximum times of repetition for random access to NPDCCH; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is less than the maximum times of repetition for random access to NPDCCH, and the third indication information indicates that the times of repetition of PDCCH is less than the times of repetition indicated in the second indication information; or the difference relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH are the same, the second indication information indicates that the times of repetition of PDCCH is greater than the maximum times of repetition for random access to NPDCCH, and the third indication information indicates that the times of repetition of PDCCH is greater than the times of repetition indicated in the second indication information.

In some embodiments of the present disclosure, the multiple relationship between the times of repetition of PDCCH and the maximum times of repetition for random access to NPDCCH includes: the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to NPDCCH divided by a seventh value, the third indication information indicates that the times of repetition of PDCCH is the maximum times of repetition for random access to NPDCCH divided by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to NPDCCH is the same, the second indication information indicates that the times of repetition of PDCCH is the maximum times of repetition for random access to the NPDCCH multiplied by a seventh value, the third indication information indicates that the times of repetition of PDCCH is the maximum times of repetition for random access to the NPDCCH multiplied by an eighth value, the seventh value is less than the eighth value, and the seventh and eighth values are integers; or the multiple relationship between the times of repetition of PDCCH and the maximum times of repetition for random access to NPDCCH includes first indication information, second indication information, and third indication information, the first indication information indicates the times of repetition of PDCCH and the maximum times of repetition for random access to the NPDCCH is the same, the second indication information indicates that the times of repetition of PDCCH is the maximum times of repetition for random access to the NPDCCH multiplied by a ninth value, the third indication information indicates that the times of repetition of PDCCH is the maximum times of repetition for random access to the NPDCCH divided by the tenth value, and the ninth value and the tenth value are integers.

In some embodiments of the present disclosure, the maximum times of repetition for random access to NPDCCH is: a maximum times of repetition of a random access response and/or MSG3 retransmission and/or MSG4 NPDCCH common search space.

In another aspect, an embodiment of the present disclosure provides a UE, including a processor, and a memory storing therein a computer program, wherein the computer program is executed by the processor so as to implement the information reporting method.

In another aspect, an embodiment of the present disclosure provides a network side device, comprising a processor, and a memory storing therein a computer program, wherein the computer program is executed by the processor so as to implement the data transmission method.

In another aspect, an embodiment of the present disclosure provides a computer-readable storage medium storing therein an instruction, wherein the instruction is executed by a computer, so as to implement the information reporting method, or implement the data transmission method.

The embodiments of the present disclosure have the following beneficial effects: in the above solution, the UE reports retransmissions times information to the network side equipment, which can assist the network side equipment to understand the interference situation of the UE, thereby using a reasonable times of retransmissions to send downlink data, reducing the random access failure rate and improving the performance of the communication system.

DETAILED DESCRIPTION

In order to make the technical problems, technical solutions, and advantages to be solved by the embodiments of the present disclosure clearer, a detailed description will be given below in conjunction with the drawings and specific embodiments.

The embodiments of the present disclosure provide an information reporting method, a data transmission method, a UE, and a network side device. The UE reports retransmission times information to the network side device so that the network side device can send downlink data with a reasonable times of retransmission.

Figure 1:
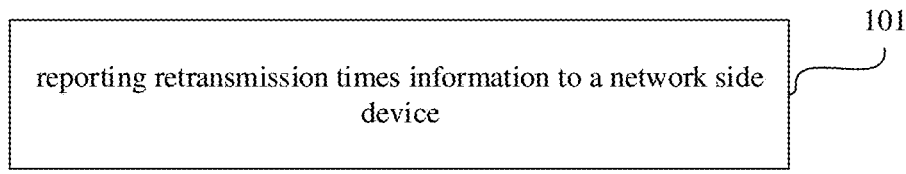
FIG. 1 is a flowchart of an information reporting method according to one embodiment of the present disclosure.

The embodiments of the present disclosure provide an information reporting method, which is applied to a UE, as shown in FIG. 1, includes the following steps.

Step 101: reporting retransmission times information to a network side device.

In this embodiment, the UE reports the retransmission times information to the network side device, which can assist the network side device to acquire the interference situation of the UE, thereby using a reasonable times of retransmission to send downlink data, reducing a random access failure rate and improving the performance of the communication system.

Further, the retransmission times information is retransmission times information of downlink data.

Further, before the reporting retransmission times information to the network side device, the method further includes: determining the retransmission time information required to complete demodulation of downlink data according to a downlink channel quality; or determining the retransmission time information according to a bit error rate threshold for demodulation of a physical downlink control channel (PDCCH).

Further, the reporting retransmission times information to the network side device includes at least one of the following: determining bit information correspond to the retransmission times information according to an acquired mapping relationship between the retransmission times information and the bit information, and reporting the bit information to the network side device; reporting retransmission times information to the network side device through a scrambling method or a modulation and coding method used for sending uplink data; reporting the retransmission times information required to complete the demodulation of downlink data to the network side device.

The mapping relationship between the retransmission times information and the bit information can be configured by the network side device, or can be pre-agreed, for example, recorded in a standard protocol.

Further, the retransmission times information includes at least one of the following: times of retransmission required by the UE to complete the demodulation of downlink data; a multiple relationship between times of retransmission required by the UE to complete the demodulation of downlink data and times of retransmission used to send uplink data; an amount relationship between the times of retransmission required by the UE to complete the demodulation of downlink data and the times of retransmission used to send uplink data; a range of the times of retransmission required by the UE to complete the demodulation of downlink data; an actual coverage area determined by the UE according to the downlink channel quality.

Further, the amount relationship includes one of the following: the times of retransmission required by the UE to complete the demodulation of downlink data is less than the times of retransmission used to send uplink data, and the times of retransmission required by the UE to complete the demodulation of downlink data belongs to a coverage area determined according to RSRP; the times of retransmission required by the UE to complete the demodulation of downlink data is greater than the times of retransmission used to send uplink data, and the times of retransmission required by the UE to complete the demodulation of downlink data belongs to the coverage area determined according to RSRP; the times of retransmission required by the UE to complete the demodulation of downlink data is greater than the times of retransmission used to send uplink data, and the times of retransmission required by the UE to complete the demodulation of downlink data is beyond the coverage area determined according to RSRP.

Further, when the bit information corresponding to the retransmission times information is reported to the network side device, the retransmission times information is carried by 2 bits. Of course, the retransmission times information is not limited to being carried by 2 bits, and can also be carried by other number of bits.

Further, when reporting the times of retransmission to the network side device, the times of retransmission is carried by 4 bits. Of course, the information on the times of retransmission is not limited to being carried by 4 bits, and can be carried by other number of bits.

Further, the downlink channel quality is determined by a signal to interference plus noise ratio (SINR).

Figure 2:
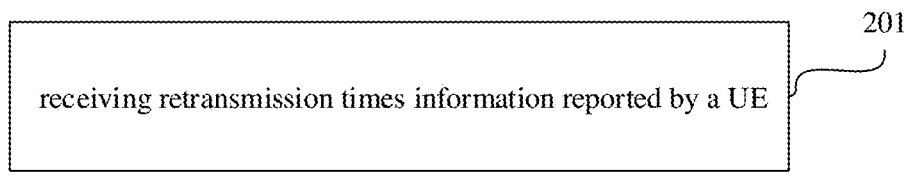
FIG. 2 is a flowchart of a data transmission method according to one embodiment of the present disclosure.

The embodiment of the present disclosure also provides a data transmission method, which is applied to a network side device, as shown in FIG. 2, includes the following steps.

Step 201: receiving retransmission times information reported by a UE.

In this embodiment, the UE reports retransmission times information to the network side device, which can assist the network side device to acquire the interference situation of the UE, thereby using a reasonable times of retransmission to send downlink data, reducing a random access failure rate and improving the performance of the communication system.

Further, the retransmission times information is retransmission times information of downlink data.

Further, after the receiving retransmission times information reported by the UE, the method further includes: performing downlink data transmission according to retransmission times information.

Further, before the receiving the retransmission times information reported by the UE, the method further includes: sending a mapping relationship between the retransmission times information and bit information to the UE.

Further, the sending the mapping relationship between retransmission times information and bit information to the UE includes: sending the mapping relationship between the retransmission times information and the bit information to the UE through a system message; or sending the mapping relationship between the retransmission times information and the bit information to the UE through a radio resource control (RRC) signaling.

Among them, there are a total of 12 options for the times of retransmission, and the network side device can issue mapping relationships between 12 types of retransmission times information and bit information, and can also issue mapping relationships between a part of 12 types of retransmission times information and bit information.

In the technical solution of the present disclosure, the UE reports the retransmission times information to the network side device using an implicit reporting method, and/or an explicit reporting method, and/or an implicit and explicit reporting method.

For the explicit reporting method, the times of retransmission or the range of the times of retransmission is carried by bits in the signaling. Specifically, there are the following two scenarios, and there are several reporting methods in each scenario.

Scenario 1: the retransmission times information reported by the UE to the network side device is carried by 2 bits.

Method 1: the UE reports the times of retransmission required for downlink demodulation to the network side device, and the signaling content reported by the UE is carried by 2 bits.

The network side device informs the UE of the mapping relationship between the times of retransmission and the bit information through radio resource control (RRC) signaling in advance, and the UE determines the times of retransmission required to demodulate the downlink data according to channel conditions (SINR) of the UE. The UE reports the required times of retransmission to the network side device according to the mapping relationship between the times of retransmission and the bit information issued by the network side device.

Specifically, the technical solution of this embodiment includes the following steps.

Step 1: the network side device informs the UE of the mapping relationship between the times of retransmission and bit information through RRC signaling (for example, 11 corresponds to 16 times of retransmission, 10 corresponds to 32 times of retransmission; 01 corresponds to 64 times of retransmission; 00 is reserved).

Step 2: the UE determines the times of retransmission required for downlink demodulation according to the channel conditions of the UE (SINK) (for example, the times of retransmission required for the UE to complete downlink demodulation is 64).

Step 3: the UE reports the times of retransmission to the network side device through signaling (for example, if the signaling content reported by the UE is 01, it means that the required times of retransmission is 64).

Method 2:

The UE reports retransmission times information required by the network side device for downlink demodulation. The reported information content is the multiple relationship between the times of retransmission required by the UE to complete the demodulation of downlink data and the times of retransmission used to send Msg1. Specifically, there are several types of reported contents.

Reported content 1: the times of retransmission required for data demodulation by the UE is twice (or ½) of the range of retransmission used by Msg1.

Reported content 2: the times of retransmission required for data demodulation by the UE is 4 times (or ¼) of the range of the times of retransmission used by Msg1.

Reported content 3: the times of retransmission required for data demodulation by the UE is 8 times (or ⅛) of the range of times of retransmission used by Msg1.

The reported content is indicated by 2 bits. For example, 11 corresponds to the reported content 1; 10 corresponds to the reported content 2; 01 corresponds to the reported content 3; 00 is reserved.

Method 3:

The UE reports the retransmission times information required by the network side device for downlink demodulation. The reported information content is the amount relationship between the times of retransmission required by the UE to complete the demodulation of downlink data and the times of retransmission used to send Msg1. Specifically, there are several types of reported contents as follows.

Reported content 1: the times of retransmission required by the UE for data demodulation is less than the range of times of retransmission used by Msg1. At this time, the times of retransmission still falls within the coverage area determined by RSRP (for example, the UE determines that the current coverage area is a normal coverage based on RSRP, the times of retransmission corresponding to normal coverage is {1, 2, 4, 8}, the times of retransmission used by the UE to send Msg1 is 8, but the actual UE can complete data reception according to a smaller times of retransmission, for example times of retransmission=4).

Reported content 2: the times of retransmission required by the UE for data demodulation is greater than the range of times of retransmission used by Msg1. At this time, the times of retransmission still belongs to the coverage area determined according to RSRP; (for example, the UE determines that the current coverage arrange is extended coverage based on RSRP, the times of retransmission corresponding to extended coverage is {16, 32, 64, 128}, the times of retransmission used by the UE to send Msg1 is 32, but the actual UE requires a larger times of retransmission to complete data reception, such as times of retransmission=64).

Reported content 3: the times of retransmission required for data demodulation of the UE is greater than the range of times of retransmission used by.

Msg1. At this time, the times of retransmission is beyond the coverage area determined by RSRP (for example, the UE determines that the current coverage is extended coverage based on RSRP, the times of retransmission corresponding to the extended coverage is {16, 32, 64, 128}, but due to strong interference, the times of retransmission required for the UE to successfully complete data demodulation is 256. For this scenario, the UE needs to report to the network by signaling).

The reported content is indicated by 2 bits. For example, 11 corresponds to the reported content 1; 10 corresponds to the reported content 2; 01 corresponds to the reported content 3; 00 is reserved.

Specifically, the technical solution of this embodiment includes the following steps.

Step 1: the UE determines the times of retransmission required for data demodulation according to the received signal strength and the interference condition (SINR).

Step 2: the UE reports the relationship between times of retransmission required for demodulation and times of retransmission used to send Msg1 through signaling, and content of the signaling is carried by 2 bits.

Step 3: the network side device determines the times of retransmission used to send the downlink data.

Method 4: the UE reports the range of times of retransmission for the network side device, and the UE determines the range of times of retransmission required to complete data reception through the downlink channel quality (SINR).

The reported content is indicated by 2 bits. For example, 11 corresponds to a range 1 of times of retransmission, and a demodulation threshold required for data demodulation within the range of times of retransmission is SINR≥X; 10 corresponds to a range 2 of times of retransmission times, and a demodulation threshold required for data demodulation within the range of times of retransmission is Y≤SINR<X; 01 corresponds to a range 3 of times of retransmission, and a demodulation threshold within the range of times of retransmission is SINR≤Y.

Specifically, the technical solution of this embodiment includes the following steps.

Step 1: the UE determines the range of times of retransmission required for demodulation according to the received signal strength and the interference condition (SINR).

If the demodulation threshold of the UE is SINR≥X, the times of retransmission required for demodulation of the UE belongs to the range 1 of times of retransmission times; if the demodulation threshold of the UE is Y≤SINR<X, the times of retransmission required for demodulation of the UE belongs to the range 2 of times of retransmission; if the demodulation threshold of the UE is SINR≤Y, the times of retransmission required for the demodulation of the UE belongs to the range 3 of times of retransmission.

Step 2: the UE reports the range of times of retransmission required by the network side device for downlink demodulation through signaling. The signaling content is carried by 2 bits.

Step 3: the network side device determines the times of retransmission used to send the downlink data.

Method 5:

The UE reports the actual coverage area of the network side device, and the UE determines the actual coverage area (including: normal coverage, extended coverage, and limit coverage) through the downlink channel quality (SINR).

The reported content is indicated by 2 bits. For example, 11 corresponds to the limit coverage; 10 corresponds to the extended coverage; 01 corresponds to the normal coverage.

If SINR X, then the UE is in the normal coverage; if Y≤SINR<X, then the UE is in the limit coverage; if SINR≤Y, then the UE is in the extended coverage. X and Y are SINR thresholds, which are used to determine the coverage area where the UE is located.

Specifically, the technical solution of this embodiment includes the following steps.

Step 1: the UE determines the coverage area (the coverage area may be different from the coverage area determined by RSRP) according to the received signal strength and interference condition (SINR).

If SINR≥X, then the UE is in the normal coverage; if Y≤SINR<X, then the UE is in the extended coverage; and if SINR≤Y, then the UE is in the limit coverage.

Step 2: the UE reports the coverage area where the network side device is located through signaling. The signaling content is carried by 2 bits;

Step 3: the network side device determines the times of retransmission used to send the downlink data.

Method 6:

When the times of retransmission reported by the UE to the network side device is only carried by 2 bits, if the correspondence relationship between the bit information and the times of retransmission cannot be determined, the protocol clearly stipulates that the UE does not report the times of retransmission in this scenario.

Scenario 2: the retransmission times information reported by the UE to the network side device is carried by 4 bits Method 1:

The UE reports the times of retransmission required by the network side device for downlink demodulation, and the UE determines the times of retransmission required for the demodulation through the downlink channel quality (SINR).

There are a total of 12 options for the times of retransmission, which require 4-bit indication. For example, the times of retransmission corresponding to 1111=2048, the times of retransmission corresponding to 1110=1024, and so on.

Specifically, the technical solution of this embodiment includes the following steps.

Step 1: the UE determines the times of retransmission required for data demodulation according to the received signal strength and the interference condition (SINR).

Step 2: the UE reports the times of retransmission by the network side device through signaling. The signaling content is carried by 4 bits.

Step 3: the network side device determines the times of retransmission used to send the downlink data.

In addition, the amount mapping relationship between bit information and retransmission times/retransmission times range/coverage area where the UE is located/the times of retransmission used to send MSG1 mentioned in the above can be consistent between the UE and the network side device by the following ways.

Way 1: the mapping relationship between bit information and retransmission times/retransmission times range/coverage area where the UE is located is issued through a system message (for example, System Information Block1 (SIB1)).

Way 2: the mapping relationship between bit information and retransmission times/retransmission times range/coverage area where the UE is located is written into the standard.

In the implicit reporting method, the UE implicitly indicates the times of retransmission or the range of the times of retransmission through a scrambling method and a modulation and coding method used to send uplink data (such as Msg 3).

In the explicit and implicit reporting method, the UE implicitly indicates a part of bits through the scrambling method, the modulation and coding method used for sending uplink data (such as Msg 3), and the part of bits are combined with bits carrying the reported content and indicating retransmission times/retransmission times range.

Figure 3:
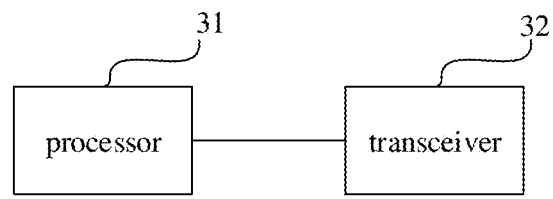
FIG. 3 is a schematic view showing a UE according to one embodiment of the present disclosure.

The embodiment of the present disclosure also provides a UE, as shown in FIG. 3, including a processor 31 and a transceiver 32.

The transceiver 32 is configured to report retransmission times information to a network side device.

In this embodiment, the UE reports retransmission times information to the network side device, which can assist the network side device to acquire the interference situation of the UE, thereby using a reasonable times of retransmission to send downlink data, reducing the random access failure rate and improving the performance of the communication system.

Further, the retransmission times information is retransmission times information of downlink data.

Further, the processor 31 is configured to determine the retransmission time information required to complete demodulation of downlink data according to a downlink channel quality; or determine the retransmission time information according to a bit error rate threshold for demodulation of a physical downlink control channel (PDCCH).

Further, the processor 31 is specifically configured to determine bit information correspond to the retransmission times information according to an acquired mapping relationship between the retransmission times information and the bit information.

The transceiver 32 is specifically configured to perform at least one of the following: report the bit information to the network side device; report the retransmission times information to the network side device through a scrambling method or a modulation and coding method used for sending uplink data; report the retransmission times information required to complete the demodulation of downlink data to the network side device.

Further, the retransmission times information includes at least one of the following: times of retransmission required by the UE to complete the demodulation of downlink data demodulation; a multiple relationship between times of retransmission required by the UE to complete the demodulation of downlink data and times of retransmission used to send uplink data; an amount relationship between the times of retransmission required by the UE to complete the demodulation of downlink data and the times of retransmission used to send the uplink data; a range of the times of retransmission required by the UE to complete the demodulation of downlink data; an actual coverage area determined by the UE according to a downlink channel quality.

Further, the amount relationship includes one of the following: the times of retransmission required by the UE to complete the demodulation of downlink data is less than the times of retransmission used to send uplink data, and the times of retransmission required by the UE to complete the demodulation of downlink data belongs to a coverage area determined according to a Reference Signal Receiving Power (RSRP); the times of retransmission required by the UE to complete the demodulation of downlink data is greater than the times of retransmission used to send uplink data, and the times of retransmission required by the UE to complete the demodulation of downlink data belongs to the coverage area determined according to RSRP; the times of retransmission required by the UE to complete the demodulation of downlink data is greater than the times of retransmission used to send uplink data, and the times of retransmission required by the UE to complete the demodulation of downlink data is beyond the coverage area determined according to RSRP.

Further, when the bit information corresponding to the retransmission times information is reported to the network side device, the retransmission times information is carried by 2 bits.

Further, when reporting the retransmission times information to the network side device, the retransmission times information is carried by 4 bits.

Further, the downlink channel quality is determined by a signal to interference plus noise ratio (SINR).

Figure 4:
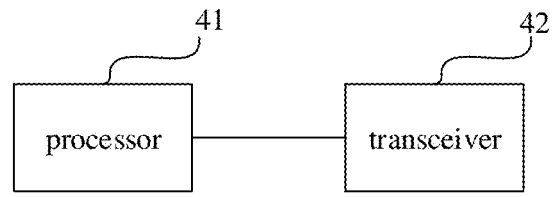
FIG. 4 is a schematic view showing a network side device according to one embodiment of the present disclosure.

The embodiment of the present disclosure also provides a network side device, as shown in FIG. 4, includes a processor 41 and a transceiver 42.

The transceiver 42 is configured to receive retransmission times information reported by a UE.

In this embodiment, the UE reports the retransmission times information to the network side device, which can assist the network side device to acquire the interference situation of the UE, thereby using a reasonable times of retransmission to send downlink data, reducing the random access failure rate and improving the performance of the communication system.

Further, the retransmission times information is retransmission times information of downlink data.

Further, the transceiver 42 is further configured to perform downlink data transmission according to the retransmission times information.

Further, the transceiver 42 is further configured to send a mapping relationship between the retransmission times information and bit information to the UE.

Further, the transceiver 42 is specifically configured to send the mapping relationship between the retransmission times information and the bit information to the UE through a system message; or send the mapping relationship between the retransmission times information and the bit information to the UE through a radio resource control (RRC) signaling.

Figure 5:
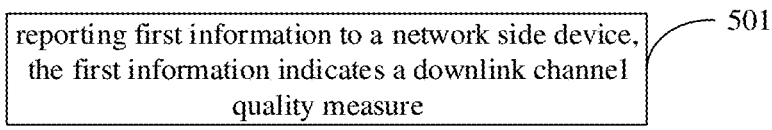
FIG. 5 is another flowchart of an information reporting method according to one embodiment of the present disclosure.

The embodiment of the present disclosure also provides an information reporting method, which is applied to a UE, as shown in FIG. 5, includes the following steps.

Step 501: reporting first information to a network side device, where the first information indicates a downlink channel quality measure.

In this embodiment, the UE reports the first information indicating the quality of the downlink channel to the network side device, which can assist the network side device to acquire the interference situation of the UE, thereby using a reasonable times of retransmission to send downlink data, reducing the random access failure rate and improving the performance of the communication system.

Further, the first information includes N information units, where the first information unit represents no measurement report; the second information unit to the Nth information unit represent second information, and N is an integer greater than 1.

Further, the first information includes at least one of the following information: times of repetition of a physical downlink control channel; a relationship between the times of repetition of the physical downlink control channel and times of repetition of NPRACH for each random access attempt; a relationship between the times of repetition of the physical downlink control channel and a maximum times of repetition for random access to NPDCCH; a range of times of repetition of the physical downlink control channel; a coverage enhancement level.

Further, before the reporting the first information to the network side device, the method further includes: determining repetition times information of physical downlink control channel (PDCCH) transmission according to a SINK of a downlink channel; or determining the repetition times information according to a bit error rate of PDCCH.

Further, the reporting the first information to the network side device includes at least one of the following: reporting downlink channel quality information to the network side device by using a decoding method of uplink data; reporting the downlink channel quality information to the network side device by using a scrambling method and/or a modulation and coding method and/or a time-frequency resource location used for sending uplink data; reporting the downlink channel quality information to the network side device, and the downlink channel quality information being characterized by a bit field; reporting the downlink channel quality information to the network side device by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and reporting the downlink channel quality information to the network side device by using the third information and fifth information, wherein the third information indicates a part of the downlink channel quality information by bits, and the fifth information implicitly indicates the remaining part of the downlink channel quality information by using the decoding method of the uplink data.

Further, before the reporting the first information to the network side device, the method further includes: acquiring a mapping relationship between downlink channel quality information and bit information issued by the network; or acquiring a mapping relationship between downlink channel quality information and bit information specified in a protocol; or determining a mapping relationship between downlink channel quality information and bit information.

Further, the times of repetition of the physical downlink control channel includes one of the following: times of repetition of PDCCH transmission; a maximum times of repetition of PDCCH transmission; a minimum times of repetition of PDCCH transmission.

Further, the first information is determined by a first constraint relationship between the times of repetition of NPRACH for each random access attempt and a first value; or by a second constraint relationship between the maximum times of repetition for random access to NPDCCH and a second value.

The first constraint relationship includes at least one of the following: multiplying by the first value; dividing by the first value; adding the first value; subtracting the first value. The second constraint relationship includes at least one of the following: multiplying by the second value; dividing by the second value; adding the second value; subtracting the second value. The first value and the second value are integers.

Further, a relationship between the times of repetition of PDCCH and the times of repetition of NPRACH for each random access attempt includes at least one of the following: a difference relationship between the times of repetition of PDCCH and the times of repetition of NPRACH for each random access attempt; a multiple relationship between the times of repetition of PDCCH and the times of repetition of NPRACH for each random access attempt.

Further, the difference relationship between the times of repetition of PDCCH and the times of repetition of NPRACH for each random access attempt includes the followings.

The difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt. Or the difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

Further, the multiple relationship between the times of repetition of the PDCCH and the times of repetition of NPRACH for each random access attempt includes the following.

The multiple relationship between the times of repetition of the PDCCH and the times of repetition of NPRACH for each random access attempt includes first indication information, second indication information, and third indication information. The first indication information indicates the times of repetition of the PDCCH is the same as the times of repetition of NPRACH for each random access attempt. The second indication information indicates that the times of repetition of PDCCH is the times of repetition of NPRACH for each random access attempt multiplied by a third value. The third indication information indicates that the times of repetition of the physical downlink control channel is the times of repetition of NPRACH for each random access attempt multiplied by a fourth value, the third value is less than the fourth value, and the third and fourth values are integers. Or the multiple relationship between the times of repetition of the physical downlink control channel and the time of repetition of NPRACH for each random access attempt includes first indication information, second indication information, and third indication information. The first indication information indicates the times of repetition of the physical downlink control channel and the times of repetition of NPRACH for each random access attempt is the same. The second indication information indicates that the times of repetition of the physical downlink control channel is the times of repetition of NPRACH for each random access attempt multiplied by a fifth value. The third indication information indicates that the times of repetition of the physical downlink control channel is the times of repetition of NPRACH for each random access attempt divided by a sixth value, and the fifth value and the sixth value are integers.

Further, the relationship between the times of repetition of the physical downlink control channel and the maximum times of repetition for random access to NPDCCH includes at least one of the following: a difference relationship between the times of repetition of the physical downlink control channel and the maximum times of repetition for random access to NPDCCH; a multiple relationship between the times of repetition of the physical downlink control channel and the maximum times of repetition for random access to NPDCCH.

Further, the difference relationship between the times of repetition of the physical downlink control channel and the maximum times of repetition for random access to NPDCCH includes the following.

The difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is less than the maximum times of repetition for random access to NPDCCH. Or, the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is less than the maximum times of repetition for random access to NPDCCH, and the third indication information indicates that the times of repetition of the physical downlink control channel is less than the times of repetition indicated in the second indication information. Or the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is greater than the times of repetition indicated in the second indication information.

Further, the multiple relationship between the times of repetition of the physical downlink control channel and the maximum times of repetition for random access to NPDCCH includes the following.

The multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to NPDCCH divided by a seventh value. The third indication information indicates that the times of repetition of the physical downlink control channel is the maximum times of repetition for random access to NPDCCH divided by an eighth value. The seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to the NPDCCH multiplied by a seventh value. The third indication information indicates that the times of repetition of the physical downlink control channel is the maximum times of repetition for random access to the NPDCCH multiplied by an eighth value, the seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to the NPDCCH is the same. The second indication information indicates that the times of repetition of the physical downlink control channel is the maximum times of repetition for random access to the NPDCCH multiplied by a ninth value. The third indication information indicates that the times of repetition of the physical downlink control channel is the maximum times of repetition for random access to the NPDCCH divided by the tenth value, and the ninth value and the tenth value are integers.

Further, the maximum times of repetition for random access to NPDCCH is: a maximum times of repetition of a random access response and/or MSG3 retransmission and/or MSG4 NPDCCH common search space.

Figure 6:
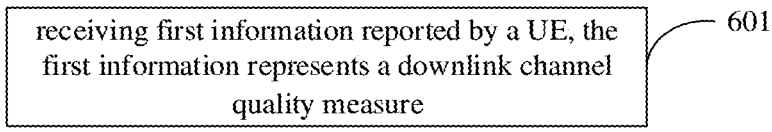
FIG. 6 is another flowchart of a data transmission method according to one embodiment of the present disclosure.

The embodiment of the present disclosure also provides a data transmission method, which is applied to a network side device, as shown in FIG. 6, includes the following steps.

Step 601: receiving first information reported by a UE, where the first information represents a downlink channel quality measure.

In this embodiment, the UE reports the first information indicating the quality of the downlink channel to the network side device, which can assist the network side device to understand the interference situation of the UE, thereby sending the downlink data using a reasonable times of retransmission, reducing random access failure rate, and improving the performance of the communication system.

Further, the first information includes N information units, where the first information unit represents no measurement report; the second information unit to the Nth information unit represent second information, and N is an integer greater than 1.

Further, the first information includes at least one of the following information: times of repetition of a physical downlink control channel; a relationship between the times of repetition of the physical downlink control channel and times of repetition of NPRACH for each random access attempt; a relationship between the times of repetition of the physical downlink control channel and a maximum times of repetition for random access to NPDCCH; a range of times of repetition of the physical downlink control channel; a coverage enhancement level.

Further, after the receiving first information reported by a UE, the method further includes: performing physical downlink control channel transmission.

Further, the receiving first information reported by a UE includes at least one of the following: receiving downlink channel quality information reported by the UE by using a decoding method of uplink data; receiving the downlink channel quality information reported by the UE by using a scrambling method and/or a modulation and coding method and/or a time-frequency resource location used for sending uplink data; receiving the downlink channel quality information reported by the UE, and the downlink channel quality information being characterized by a bit field; receiving the downlink channel quality information reported by the UE by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and receiving the downlink channel quality information reported by the UE by using the third information and fifth information, wherein the third information indicates a part of the downlink channel quality information by bits, and the fifth information implicitly indicates the remaining part of the downlink channel quality information by using the decoding method of the uplink data.

Further, before the receiving first information reported by a UE, the method further includes: issuing a mapping relationship between downlink channel quality information and bit information to the UE.

Further, the times of repetition of the physical downlink control channel includes one of the following: times of repetition of PDCCH transmission; a maximum times of repetition of PDCCH transmission; a minimum times of repetition of PDCCH transmission.

Further, the first information is determined by a first constraint relationship between the times of repetition of NPRACH for each random access attempt and a first value; or by a second constraint relationship between the maximum times of repetition for random access to NPDCCH and a second value.

The first constraint relationship includes at least one of the following: multiplying by the first value; dividing by the first value; adding the first value; subtracting the first value. The second constraint relationship includes at least one of the following: multiplying by the second value; dividing by the second value; adding the second value; subtracting the second value. The first value and the second value are integers.

Further, a relationship between the times of repetition of PDCCH and the times of repetition of NPRACH for each random access attempt includes at least one of the following: a difference relationship between the times of repetition of PDCCH and the times of repetition of NPRACH for each random access attempt; a multiple relationship between the times of repetition of PDCCH and the times of repetition of NPRACH for each random access attempt.

Further, the difference relationship between the times of repetition of PDCCH and the times of repetition of NPRACH for each random access attempt includes the followings.

The difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt. Or the difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

Further, the multiple relationship between the times of repetition of the PDCCH and the times of repetition of NPRACH for each random access attempt includes the following.

The multiple relationship between the times of repetition of the PDCCH and the times of repetition of NPRACH for each random access attempt includes first indication information, second indication information, and third indication information. The first indication information indicates the times of repetition of the PDCCH is the same as the times of repetition of NPRACH for each random access attempt. The second indication information indicates that the times of repetition of PDCCH is the times of repetition of NPRACH for each random access attempt multiplied by a third value. The third indication information indicates that the times of repetition of the physical downlink control channel is the times of repetition of NPRACH for each random access attempt multiplied by a fourth value, the third value is less than the fourth value, and the third and fourth values are integers. Or the multiple relationship between the times of repetition of the physical downlink control channel and the time of repetition of NPRACH for each random access attempt includes first indication information, second indication information, and third indication information. The first indication information indicates the times of repetition of the physical downlink control channel and the times of repetition of NPRACH for each random access attempt is the same. The second indication information indicates that the times of repetition of the physical downlink control channel is the times of repetition of NPRACH for each random access attempt multiplied by a fifth value. The third indication information indicates that the times of repetition of the physical downlink control channel is the times of repetition of NPRACH for each random access attempt divided by a sixth value, and the fifth value and the sixth value are integers.

Further, the relationship between the times of repetition of the physical downlink control channel and the maximum times of repetition for random access to NPDCCH includes at least one of the following: a difference relationship between the times of repetition of the physical downlink control channel and the maximum times of repetition for random access to NPDCCH; a multiple relationship between the times of repetition of the physical downlink control channel and the maximum times of repetition for random access to NPDCCH.

Further, the difference relationship between the times of repetition of the physical downlink control channel and the maximum times of repetition for random access to NPDCCH includes the following.

The difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is less than the maximum times of repetition for random access to NPDCCH. Or, the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is less than the maximum times of repetition for random access to NPDCCH, and the third indication information indicates that the times of repetition of the physical downlink control channel is less than the times of repetition indicated in the second indication information. Or the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is greater than the times of repetition indicated in the second indication information.

Further, the multiple relationship between the times of repetition of the physical downlink control channel and the maximum times of repetition for random access to NPDCCH includes the following.

The multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to NPDCCH divided by a seventh value. The third indication information indicates that the times of repetition of the physical downlink control channel is the maximum times of repetition for random access to NPDCCH divided by an eighth value. The seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to the NPDCCH multiplied by a seventh value. The third indication information indicates that the times of repetition of the physical downlink control channel is the maximum times of repetition for random access to the NPDCCH multiplied by an eighth value, the seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to the NPDCCH is the same. The second indication information indicates that the times of repetition of the physical downlink control channel is the maximum times of repetition for random access to the NPDCCH multiplied by a ninth value. The third indication information indicates that the times of repetition of the physical downlink control channel is the maximum times of repetition for random access to the NPDCCH divided by the tenth value, and the ninth value and the tenth value are integers.

Further, the maximum times of repetition for random access to NPDCCH is: a maximum times of repetition of a random access response and/or MSG3 retransmission and/or MSG4 NPDCCH common search space.

The embodiment of the present disclosure also provides a UE, as shown in FIG. 3, including a processor 31 and a transceiver 32.

The transceiver 32 is configured to report first information to a network side device, where the first information represents a downlink channel quality measure.

In this embodiment, the UE reports the first information indicating the quality of the downlink channel to the network side device, which can assist the network side device to understand the interference situation of the UE, thereby sending the downlink data by using a reasonable times of retransmission, reducing random access failure rate, and improving the performance of the communication system.

Further, the first information includes N information units, where the first information unit represents no measurement report; the second information unit to the Nth information unit represent second information, and N is an integer greater than 1.

Further, the first information includes at least one of the following information: times of repetition of a physical downlink control channel; a relationship between the times of repetition of the physical downlink control channel and times of repetition of NPRACH for each random access attempt; a relationship between the times of repetition of the physical downlink control channel and a maximum times of repetition for random access to NPDCCH; a range of times of repetition of the physical downlink control channel; a coverage enhancement level.

Further, the processor 31 is configured to determine repetition times information of physical downlink control channel (PDCCH) transmission according to a SINK of a downlink channel; or determine the repetition times information according to a bit error rate of PDCCH.

Further, the transceiver 32 is configured to perform at least one of the following: reporting downlink channel quality information to the network side device by using a decoding method of uplink data; reporting the downlink channel quality information to the network side device by using a scrambling method and/or a modulation and coding method and/or a time-frequency resource location used for sending uplink data; reporting the downlink channel quality information to the network side device, and the downlink channel quality information being characterized by a bit field; reporting the downlink channel quality information to the network side device by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and reporting the downlink channel quality information to the network side device by using the third information and fifth information, wherein the third information indicates a part of the downlink channel quality information by bits, and the fifth information implicitly indicates the remaining part of the downlink channel quality information by using the decoding method of the uplink data.

Further, the processor 31 is also configured to acquire a mapping relationship between downlink channel quality information and bit information issued by the network; or acquire a mapping relationship between downlink channel quality information and bit information specified in a protocol; or determine a mapping relationship between downlink channel quality information and bit information.

Further, the times of repetition of the physical downlink control channel includes one of the following: times of repetition of PDCCH transmission; a maximum times of repetition of PDCCH transmission; a minimum times of repetition of PDCCH transmission.

Further, the first information is determined by a first constraint relationship between the times of repetition of NPRACH for each random access attempt and a first value; or by a second constraint relationship between the maximum times of repetition for random access to NPDCCH and a second value.

The first constraint relationship includes at least one of the following: multiplying by the first value; dividing by the first value; adding the first value; subtracting the first value. The second constraint relationship includes at least one of the following: multiplying by the second value; dividing by the second value; adding the second value; subtracting the second value. The first value and the second value are integers.

Further, a relationship between the times of repetition of PDCCH and the times of repetition of NPRACH for each random access attempt includes at least one of the following: a difference relationship between the times of repetition of PDCCH and the times of repetition of NPRACH for each random access attempt; a multiple relationship between the times of repetition of PDCCH and the times of repetition of NPRACH for each random access attempt.

Further, the difference relationship between the times of repetition of PDCCH and the times of repetition of NPRACH for each random access attempt includes the followings.

The difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt. Or the difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

Further, the multiple relationship between the times of repetition of the PDCCH and the times of repetition of NPRACH for each random access attempt includes the following.

The multiple relationship between the times of repetition of the PDCCH and the times of repetition of NPRACH for each random access attempt includes first indication information, second indication information, and third indication information. The first indication information indicates the times of repetition of the PDCCH is the same as the times of repetition of NPRACH for each random access attempt. The second indication information indicates that the times of repetition of PDCCH is the times of repetition of NPRACH for each random access attempt multiplied by a third value. The third indication information indicates that the times of repetition of the physical downlink control channel is the times of repetition of NPRACH for each random access attempt multiplied by a fourth value, the third value is less than the fourth value, and the third and fourth values are integers. Or the multiple relationship between the times of repetition of the physical downlink control channel and the time of repetition of NPRACH for each random access attempt includes first indication information, second indication information, and third indication information. The first indication information indicates the times of repetition of the physical downlink control channel and the times of repetition of NPRACH for each random access attempt is the same. The second indication information indicates that the times of repetition of the physical downlink control channel is the times of repetition of NPRACH for each random access attempt multiplied by a fifth value. The third indication information indicates that the times of repetition of the physical downlink control channel is the times of repetition of NPRACH for each random access attempt divided by a sixth value, and the fifth value and the sixth value are integers.

Further, the relationship between the times of repetition of the physical downlink control channel and the maximum times of repetition for random access to NPDCCH includes at least one of the following: a difference relationship between the times of repetition of the physical downlink control channel and the maximum times of repetition for random access to NPDCCH; a multiple relationship between the times of repetition of the physical downlink control channel and the maximum times of repetition for random access to NPDCCH.

Further, the difference relationship between the times of repetition of the physical downlink control channel and the maximum times of repetition for random access to NPDCCH includes the following.

The difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is less than the maximum times of repetition for random access to NPDCCH. Or, the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is less than the maximum times of repetition for random access to NPDCCH, and the third indication information indicates that the times of repetition of the physical downlink control channel is less than the times of repetition indicated in the second indication information. Or the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is greater than the times of repetition indicated in the second indication information.

Further, the multiple relationship between the times of repetition of the physical downlink control channel and the maximum times of repetition for random access to NPDCCH includes the following.

The multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to NPDCCH divided by a seventh value. The third indication information indicates that the times of repetition of the physical downlink control channel is the maximum times of repetition for random access to NPDCCH divided by an eighth value. The seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to the NPDCCH multiplied by a seventh value. The third indication information indicates that the times of repetition of the physical downlink control channel is the maximum times of repetition for random access to the NPDCCH multiplied by an eighth value, the seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to the NPDCCH is the same. The second indication information indicates that the times of repetition of the physical downlink control channel is the maximum times of repetition for random access to the NPDCCH multiplied by a ninth value. The third indication information indicates that the times of repetition of the physical downlink control channel is the maximum times of repetition for random access to the NPDCCH divided by the tenth value, and the ninth value and the tenth value are integers.

Further, the maximum times of repetition for random access to NPDCCH is: a maximum times of repetition of a random access response and/or MSG3 retransmission and/or MSG4 NPDCCH common search space.

The embodiment of the present disclosure also provides a network side device, as shown in FIG. 4, including a processor 41 and a transceiver 42.

The transceiver 42 is configured to receive first information reported by a UE, where the first information represents a downlink channel quality measure.

In this embodiment, the UE reports the first information indicating the quality of the downlink channel to the network side device, which can assist the network side device to understand the interference situation of the UE, thereby sending the downlink data using a reasonable times of retransmission, reducing random access failure rate, and improving the performance of the communication system.

Further, the first information includes N information units, where the first information unit represents no measurement report; the second information unit to the Nth information unit represent second information, and N is an integer greater than 1.

Further, the first information includes at least one of the following information: times of repetition of a physical downlink control channel; a relationship between the times of repetition of the physical downlink control channel and times of repetition of NPRACH for each random access attempt; a relationship between the times of repetition of the physical downlink control channel and a maximum times of repetition for random access to NPDCCH; a range of times of repetition of the physical downlink control channel; a coverage enhancement level.

Further, the transceiver 42 is also configured to perform physical downlink control channel transmission.

Further, the transceiver 42 is specifically configured to perform at least one of the following: receiving downlink channel quality information reported by the UE by using a decoding method of uplink data; receiving the downlink channel quality information reported by the UE by using a scrambling method and/or a modulation and coding method and/or a time-frequency resource location used for sending uplink data; receiving the downlink channel quality information reported by the UE, and the downlink channel quality information being characterized by a bit field; receiving the downlink channel quality information reported by the UE by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and receiving the downlink channel quality information reported by the UE by using the third information and fifth information, wherein the third information indicates a part of the downlink channel quality information by bits, and the fifth information implicitly indicates the remaining part of the downlink channel quality information by using the decoding method of the uplink data.

Further, the transceiver 42 is also configured to issue a mapping relationship between downlink channel quality information and bit information to the UE.

Further, the times of repetition of the physical downlink control channel includes one of the following: times of repetition of PDCCH transmission; a maximum times of repetition of PDCCH transmission; a minimum times of repetition of PDCCH transmission.

Further, the first information is determined by a first constraint relationship between the times of repetition of NPRACH for each random access attempt and a first value; or by a second constraint relationship between the maximum times of repetition for random access to NPDCCH and a second value.

The first constraint relationship includes at least one of the following: multiplying by the first value; dividing by the first value; adding the first value; subtracting the first value. The second constraint relationship includes at least one of the following: multiplying by the second value; dividing by the second value; adding the second value; subtracting the second value. The first value and the second value are integers.

Further, a relationship between the times of repetition of PDCCH and the times of repetition of NPRACH for each random access attempt includes at least one of the following: a difference relationship between the times of repetition of PDCCH and the times of repetition of NPRACH for each random access attempt; a multiple relationship between the times of repetition of PDCCH and the times of repetition of NPRACH for each random access attempt.

Further, the difference relationship between the times of repetition of PDCCH and the times of repetition of NPRACH for each random access attempt includes the followings.

The difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is less than the times of repetition of NPRACH for each random access attempt. Or the difference relationship between the times of repetition of PDCCH and the times of repetition of NPRACH for each random access attempt includes first indication information, second indication information, and third indication information. The first indication information indicates the times of repetition of PDCCH is the same as the times of repetition of NPRACH for each random access attempt, the second indication information indicates that the times of repetition of PDCCH is greater than the times of repetition of NPRACH for each random access attempt, and the third indication information indicates that the times of repetition of PDCCH is greater than times of repetition indicated by the second indication information.

Further, the multiple relationship between the times of repetition of the PDCCH and the times of repetition of NPRACH for each random access attempt includes the following.

The multiple relationship between the times of repetition of the PDCCH and the times of repetition of NPRACH for each random access attempt includes first indication information, second indication information, and third indication information. The first indication information indicates the times of repetition of the PDCCH is the same as the times of repetition of NPRACH for each random access attempt. The second indication information indicates that the times of repetition of PDCCH is the times of repetition of NPRACH for each random access attempt multiplied by a third value. The third indication information indicates that the times of repetition of the physical downlink control channel is the times of repetition of NPRACH for each random access attempt multiplied by a fourth value, the third value is less than the fourth value, and the third and fourth values are integers. Or the multiple relationship between the times of repetition of the physical downlink control channel and the time of repetition of NPRACH for each random access attempt includes first indication information, second indication information, and third indication information. The first indication information indicates the times of repetition of the physical downlink control channel and the times of repetition of NPRACH for each random access attempt is the same. The second indication information indicates that the times of repetition of the physical downlink control channel is the times of repetition of NPRACH for each random access attempt multiplied by a fifth value. The third indication information indicates that the times of repetition of the physical downlink control channel is the times of repetition of NPRACH for each random access attempt divided by a sixth value, and the fifth value and the sixth value are integers.

Further, the relationship between the times of repetition of the physical downlink control channel and the maximum times of repetition for random access to NPDCCH includes at least one of the following: a difference relationship between the times of repetition of the physical downlink control channel and the maximum times of repetition for random access to NPDCCH; a multiple relationship between the times of repetition of the physical downlink control channel and the maximum times of repetition for random access to NPDCCH.

Further, the difference relationship between the times of repetition of the physical downlink control channel and the maximum times of repetition for random access to NPDCCH includes the following.

The difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is less than the maximum times of repetition for random access to NPDCCH. Or, the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is less than the maximum times of repetition for random access to NPDCCH, and the third indication information indicates that the times of repetition of the physical downlink control channel is less than the times of repetition indicated in the second indication information. Or the difference relationship between the times of repetition of the physical downlink control channel and the maximum times of repetition for random access to NPDCCH includes the first indication information, the second indication information, and the third indication information. The first indication information indicates the times of repetition of the physical downlink control channel and the maximum times of repetition for random access to NPDCCH are the same, the second indication information indicates that the times of repetition of the physical downlink control channel is greater than the maximum times of repetition for random access to NPDCCH, and the third indication information indicates that the times of repetition of the physical downlink control channel is greater than the times of repetition indicated in the second indication information.

Further, the multiple relationship between the times of repetition of the physical downlink control channel and the maximum times of repetition for random access to NPDCCH includes the following.

The multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to NPDCCH divided by a seventh value. The third indication information indicates that the times of repetition of the physical downlink control channel is the maximum times of repetition for random access to NPDCCH divided by an eighth value. The seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to NPDCCH is the same. The second indication information indicates that the times of repetition of the physical downlink control channel is the maximum times of repetition for random access to the NPDCCH multiplied by a seventh value. The third indication information indicates that the times of repetition of the physical downlink control channel is the maximum times of repetition for random access to the NPDCCH multiplied by an eighth value, the seventh value is less than the eighth value, and the seventh and eighth values are integers. Or the multiple relationship between the times of repetition of the physical downlink control channel and the maximum times of repetition for random access to NPDCCH includes first indication information, second indication information, and third indication information. The first indication information indicates the times of repetition of the physical downlink control channel and the maximum times of repetition for random access to the NPDCCH is the same. The second indication information indicates that the times of repetition of the physical downlink control channel is the maximum times of repetition for random access to the NPDCCH multiplied by a ninth value. The third indication information indicates that the times of repetition of the physical downlink control channel is the maximum times of repetition for random access to the NPDCCH divided by the tenth value, and the ninth value and the tenth value are integers.

Further, the maximum times of repetition for random access to NPDCCH is: a maximum times of repetition of a random access response and/or MSG3 retransmission and/or MSG4 NPDCCH common search space.

In the technical solution of the present disclosure, the UE reports the retransmission times information to the network side device using an implicit reporting method, and/or an explicit reporting method, and/or an implicit and explicit reporting method, etc.

Regarding the explicit reporting method, the UE carries the times of retransmission or a range of the times of retransmission through bits in the signaling. Specifically, there are several reporting methods as follows.

Method One:

The UE reports the downlink channel quality measure to the network side device. The reported information content is: a multiple relationship between the times of repetition of the physical downlink control channel and the maximum times of repetition (Rmax) for random access to NPDCCH. Specifically, there are the following report contents.

Report content 1: the times of repetition of the physical downlink control channel is twice (or ½) the maximum time of repetition (Rmax) for random access to NPDCCH.

Report content 2: the times of repetition of the physical downlink control channel is 4 times (or ¼) the maximum times of repetition (Rmax) for random access NPDCCH.

Report content 3: the times of repetition of the physical downlink control channel is equal to the maximum times of repetition (Rmax) for random access to NPDCCH.

The times of repetition of the physical downlink control channel reported by the UE can only be a value in {1, 2, 4, 8, 16, 32, 64, 128, 256, 512, 1024, 2048}.

The reported content is indicated by 2 bits. For example, 11 corresponds to the report content 1; 10 corresponds to the report content 2; 01 corresponds to the report content 3; 00 represents no measurement.

If the bit content reported by the UE is 11, it means that the multiple relationship between the times of repetition of the physical downlink control channel and the maximum times of repetition (Rmax) for random access to the NPDCCH is 2 times (or ½ times); if the bit content reported by the UE is 10, it means that the multiple relationship between the times of repetition of the physical downlink control channel and the maximum times of repetition (Rmax) for random access to NPDCCH is 4 times (or ¼ times); if the bit content reported by the UE is 01, it means that the multiple relationship between the times of repetition of the physical downlink control channel and the maximum times of repetition (Rmax) for random access to NPDCCH is 1 time.

Method Two:

The UE reports the downlink channel quality measure to the network side device. The reported information content is the difference relationship between the times of repetition of the physical downlink control channel and the maximum times of repetition (Rmax) for random access to NPDCCH. There are several types of reported contents as follows.

Report content 1: the times of repetition of the physical downlink control channel is equal to the maximum times of repetition (Rmax) of random access to the NPDCCH.

Report content 2: the times of repetition of the physical downlink control channel is greater than the maximum times of repetition (Rmax) for random access to the NPDCCH.

Report content 3: The times of repetition of the physical downlink control channel is less than the maximum times of repetition (Rmax) for random access to the NPDCCH.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Method Three:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) of random access to the NPDCCH.

Report content 2: the times of repetition of the physical downlink control channel is greater than the maximum times of repetition (Rmax) for random access to the NPDCCH, and the difference between them is less than or equal to a first value. The first value is a non-zero integer (for example, the first value=128).

Report content 3: the times of repetition of the physical downlink control channel is greater than the maximum times of repetition (Rmax) for random access to the NPDCCH. The difference between them is less than or equal to a second value. The second value is a non-zero integer, and the second value is greater than the first value (for example, the second value=1024).

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

If the bit content reported by the UE is 10, it means that the difference between the times of repetition of the physical downlink control channel and the maximum times of repetition (Rmax) for random access to the NPDCCH is less than or equal to 128. Assuming Rmax=16, the times of repetition of the physical downlink control channel is {32, 64, 128}.

If the bit content reported by the UE is 01, it means that the difference between the times of repetition of the physical downlink control channel and the maximum times of repetition (Rmax) for random access to the NPDCCH is less than or equal to 1024. Assuming Rmax=16, the times of repetition of the physical downlink control channel is {256, 512, 1024}.

Method Four:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) of random access to the NPDCCH.

Report content 2: the times of repetition of the physical downlink control channel is greater than the maximum times of repetition (Rmax) for random access to NPDCCH, and the difference between them is less than or equal to Σ2^k, n≤k≤m−1, n is the power value of the integer power of 2 corresponding to Rmax, m is the power value of the integer power of 2 corresponding to a certain times of retransmission, and n, m, and k are all positive integers. For example, Rmax=32, m is the power value of the integer power of 2 corresponding to the times of retransmission=128 (corresponding to m=7), and the difference between them is less than or equal to 2^5+2^6=96.

Report content 3: the times of repetition of the physical downlink control channel is greater than the maximum times of repetition (Rmax) for random access to the NPDCCH. The difference between them is less than or equal to Σ2^k+Σ2^j, n≤k≤m−1, n is the power value of the integer power of 2 corresponding to Rmax, and m is the power value of the integer power of 2 corresponding to a certain times of retransmission, the values of n and m are the same as the values in the report content 2, m≤j≤p−1, n, m, k, j, p are all positive integers. For example, Rmax=32, M is the power value of the integer power of 2 corresponding to the times of retransmission=128 (corresponding to m=7), where p is the power value of the integer power of 2 corresponding to the times of retransmission=2048 (corresponding to p=11), At this time, the difference between them is less than or equal to 96+2^7+2^8+2^9+2^10=2016.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

If the bit content reported by the UE is 10, it means that the difference between the times of repetition of the physical downlink control channel and the maximum times of repetition (Rmax) for the random access NPDCCH is less than or equal to 96. Assuming Rmax=32, the times of repetition of the physical downlink control channel is {64, 128}.

If the bit content reported by the UE is 01, it means that the difference between the times of repetition of the physical downlink control channel and the maximum times of repetition (Rmax) for the random access to the NPDCCH is less than or equal to 2016. Assuming Rmax=32, the times of repetition of the physical downlink control channel is {256, 512, 1024, 2048}.

Method Five:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) for random access to the NPDCCH.

Report content 2: the times of repetition of the physical downlink control channel is less than the maximum times of repetition (Rmax) for random access to NPDCCH, and the difference between them is less than or equal to Σ2^k, m≤k≤n−1, n is the power value of the integer power of 2 corresponding to Rmax, m is the power value of the integer power of 2 corresponding to a certain times of retransmission, and n, m, and k are all positive integers. For example, Rmax=512 (2^9, that is, n=9), m is the power value of the integer power of 2 corresponding to the times of retransmission=64 (corresponding to m=6), and the difference between them is less than or equal to 2.^6+2^7+2^8=448.

Report content 3: the times of repetition of the physical downlink control channel is less than the maximum times of repetition (Rmax) for random access to the NPDCCH. The difference between them is less than or equal to Σ2^k+Σ2^j, m≤k≤n−1, n is the power value of the integer power of 2 corresponding to Rmax, and m is the power value of the integer power of 2 corresponding to a certain times of retransmission, the values of n and m are the same as the values in the report content 2, p≤j≤m−1, n, m, k, j, p are all positive integers. For example, Rmax=512 (2^9, i.e. n=9), m is the power value of the integer power of 2 corresponding to the times of retransmission=64 (corresponding to m=6), where p is the power value of the integer power of 2 corresponding to the times of retransmission=1 (corresponding to p=0), the difference between them is less than or equal to 448+2^0+2^1+2^2+2^3+2^4+2^5=511.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

If the bit content reported by the terminal is 10, it means that the difference between the times of repetition of the physical downlink control channel and the maximum times of repetition (Rmax) for the random access to the NPDCCH is less than or equal to 416. Assuming Rmax=512, the times of repetition of the physical downlink control channel is {256, 128, 64}.

If the bit content reported by the UE is 01, it means that the difference between the times of repetition of the physical downlink control channel and the maximum times of repetition (Rmax) for the random access NPDCCH is less than or equal to 511. Assuming Rmax=512, the times of repetition of the physical downlink control channel is {32, 16, 8, 4, 2, 1}.

Method Six:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) of random access to the NPDCCH.

Report content 2: the times of repetition of the physical downlink control channel is greater than the maximum times of repetition (Rmax) for random access to the NPDCCH, and the difference between them is $2^n$, where n is the power value of the integer power of 2 corresponding to Rmax.

Report content 3: the times of repetition of the physical downlink control channel is greater than the maximum times of repetition (Rmax) for random access to the NPDCCH. The difference between them is $2^{(n+1)}+2^n$, where n is the power value of the integer power of 2 corresponding to Rmax.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 10, it means that the times of repetition of the physical downlink control channel is greater than the maximum times of repetition (Rmax) for random access to the NPDCCH, and the difference between them is 32; if the bit content reported by the UE is 01, it means that the times of repetition of the physical downlink control channel is greater than the maximum times of repetition (Rmax) for random access to NPDCCH, and the difference between them=96; if the bit content reported by the UE is 11, it means the difference between the times of repetition of the physical downlink control channel and the maximum times of repetition (Rmax) for random access to the NPDCCH=0.

Method Seven:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) for random access to the NPDCCH.

Report content 2: the times of repetition of the physical downlink control channel is less than the maximum times of repetition (Rmax) for random access to NPDCCH, the difference between them is $2^{(n-1)}$, n is the power value of the integer power of 2 corresponding to Rmax.

Report content 3: the times of repetition of the physical downlink control channel is greater than the maximum times of repetition (Rmax) for random access to the NPDCCH, and the difference between them is $2^n$, where n is the power value of the integer power of 2 corresponding to Rmax.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 10, it means that the times of repetition of the physical downlink control channel is less than the maximum times of repetition (Rmax) for random access to NPDCCH, and the difference between them is 16; if the bit content reported by the UE is 01, it means that the times of repetition of the physical downlink control channel is greater than the maximum times of repetition (Rmax) for random access to NPDCCH, and the difference between them=32; if the bit content reported by the UE is 11, it means that the difference between the times of repetition of physical downlink control channel is and the maximum times of repetition (Rmax) for random access to the NPDCCH=0.

Method Eight:

The UE reports the downlink channel quality measure to the network side device. The reported information content is the difference relationship between the times of repetition of the physical downlink control channel and the maximum times of repetition (Rmax) for random access to the NPDCCH. Specifically, there are the following report contents.

Report content 1: the times of repetition of the physical downlink control channel is equal to the maximum times of repetition (Rmax) for random access to the NPDCCH.

Report content 2: the times of repetition of the physical downlink control channel is less than the maximum times of repetition (Rmax) for random access to NPDCCH, the difference between them is $2^{(n-1)}$, n is the power value of the integer power of 2 corresponding to Rmax.

Report content 3: the times of repetition of the physical downlink control channel is less than the maximum times of repetition (Rmax) for random access to the NPDCCH. The difference between them is $2^{(n-1)}+2^{(n-2)}$, n is the power value of the integer power of 2 corresponding to Rmax.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 10, it means that the times of repetition of the physical downlink control channel is less than the maximum times of repetition for random access to NPDCCH (Rmax), and the difference between them is 16; if the bit content reported by the UE is 01, it means that the times of repetition of the physical downlink control channel is less than the maximum times of repetition (Rmax) for random access to NPDCCH, and the difference between them=24; if the bit content reported by the UE is 11, it means the difference between the times of repetition of the physical downlink control channel and the maximum times of repetition (Rmax) for random access to the NPDCCH=0.

Method Nine:

The UE reports the downlink channel quality measure to the network side device. The reported information content is the times of repetition of the physical downlink control channel. The times of repetition of the physical downlink control channel is determined by a first constraint relationship between the maximum times of repetition (Rmax) for random access to the NPDCCH and the first value. Specifically, there are the following report contents.

Report content 1: the times of repetition of the physical downlink control channel=the maximum times of repetition for random access to the NPDCCH (Rmax)×2 (or Rmax×½).

Report content 2: the times of repetition of the physical downlink control channel=the maximum times of repetition for random access to NPDCCH (Rmax)×4 (or Rmax×¼);

Report content 3: the times of repetition of the physical downlink control channel=the maximum times of repetition (Rmax) for random access to the NPDCCH.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 11, it means that the times of repetition of the physical downlink control channel is greater than=64 (or 16); if the bit content reported by the UE is 10, it means the times of repetition of the physical downlink control channel=128 (or 8); if the bit content reported by the UE is 01, it means that the times of repetition of the physical downlink control channel=32.

Method Ten:

The UE reports the downlink channel quality measure to the network side device. The reported information content is the times of repetition of the physical downlink control channel. The times of repetition of the physical downlink control channel is determined by the first constraint relationship between the maximum times of repetition (Rmax) for random access to the NPDCCH and the first value. Specifically, there are the following report contents.

Report content 1: the times of repetition of the physical downlink control channel=the maximum times of repetition of random access to NPDCCH (Rmax)+2^n, where n is the power value of the integer power of 2 corresponding to Rmax (or Rmax−2^(n−1)).

Report content 2: the times of repetition of the physical downlink control channel=the maximum times of repetition for random access to NPDCCH (Rmax)+2^n+2^(n+1), where n is the power value of the integer power of 2 corresponding to Rmax (or Rmax−2^(n−1)−2−n).

Report content 3: the times of repetition of the physical downlink control channel=the maximum times of repetition (Rmax) for random access to the NPDCCH.

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 11, it means that the times of repetition of the physical downlink control channel is greater than=64 (or 16); if the bit content reported by the UE is 10, it means the times of repetition of the physical downlink control channel=128 (or 8); If the bit content reported by the UE is 01, it means that the times of repetition of the physical downlink control channel=32.

Method Eleven:

The UE reports the downlink channel quality measure to the network side device. The reported information content is the times of repetition of the physical downlink control channel. Specifically, there are the following report contents.

Report content 1: the times of repetition of the physical downlink control channel=the maximum times of repetition (Rmax) for random access to the NPDCCH.

Report content 2: a first maximum value of the times of repetition of the physical downlink control channel (for example, the first maximum value=256).

Report content 3: a second maximum value of the times of repetition of the physical downlink control channel (for example, the second maximum value=2048).

The times of repetition of the physical downlink control channel reported by the UE can only be a value in {1, 2, 4, 8, 16, 32, 64, 128, 256, 512, 1024, 2048}.

The report content is indicated by 2 bits. For example, 11 corresponds to the report content 1; 10 corresponds to the report content 2; 01 corresponds to the report content 3; 00 represents no measurement.

Assuming Rmax=32, if the bit content reported by the UE is 11, it means the times of repetition of the physical downlink control channel=32; if the bit content reported by the UE is 10, it means the times of repetition of the physical downlink control channel={64, 128, 256}; If the bit content reported by the UE is 01, it means that the times of repetition of the physical downlink control channel={512, 1024, 2048}.

Method Twelve:

The UE reports the downlink channel quality measure to the network side device. The reported information content is the times of repetition of the physical downlink control channel. Specifically, there are the following report contents.

Report content 1: the times of repetition of the physical downlink control channel=the maximum times of repetition (Rmax) for random access to the NPDCCH.

Report content 2: a first maximum value of the times of repetition of the physical downlink control channel (for example, the first maximum value=256).

Report content 3: a first minimum value of the times of repetition of the physical downlink control channel (for example, the first minimum value=8).

The report content is indicated by 2 bits. For example, 11 corresponds to the report content 1; 10 corresponds to the report content 2; 01 corresponds to the report content 3; 00 represents no measurement.

The times of repetition of the physical downlink control channel reported by the UE can only be a value in {1, 2, 4, 8, 16, 32, 64, 128, 256, 512, 1024, 2048}.

Assuming Rmax=32, if the bit content reported by the UE is 11, it means the times of repetition of the physical downlink control channel=32; if the bit content reported by the UE is 10, it means the times of repetition of the physical downlink control channel={64, 128, 256}; If the bit content reported by the UE is 01, it means that the times of repetition of the physical downlink control channel={8, 16}.

Method Thirteen:

The UE reports the downlink channel quality measure to the network side device. The reported information content is the times of repetition of the physical downlink control channel, and the times of repetition represents a maximum times of repetition required for NPDCCH demodulation. Specifically, there are the following report contents.

Report content 1: the times of repetition of the physical downlink control channel=the times of repetition of NPDCCH-1.

Report content 2: the times of repetition of the physical downlink control channel=the times of repetition of NPDCCH-2.

Report content 3: the times of repetition of the physical downlink control channel=the times of repetition of NPDCCH-3.

The report content is indicated by 2 bits. For example, 11 corresponds to the report content 1; 10 corresponds to the report content 2; 01 corresponds to the report content 3; 00 represents no measurement.

The times of repetition of the physical downlink control channel reported by the UE can only be a value in {1, 2, 4, 8, 16, 32, 64, 128, 256, 512, 1024, 2048}.

For example, the times of repetition of NPDCCH-1/2/3 are 1, 64, and 2048 respectively. If the times of repetition required for the demodulation of the physical downlink control channel=1, the UE reports 11; if the times of repetition required for the demodulation of the physical downlink control channel={2, 4, 8, 16, 32, 64}, then the UE reports 10; if the times of repetition required for the demodulation of physical downlink control channel={128, 256, 512, 1024, 2048}, then the UE reports 01.

The embodiment of the present disclosure also provides a UE, including a memory, a processor, and a computer program stored on the memory and executed by the processor to implement the above information reporting method.

The embodiment of the present disclosure also provides a network side device, including a memory, a processor, and a computer program stored on the memory and executed by the processor to implement the above data transmission method.

The embodiments of the present disclosure also provide a computer-readable storage medium on which a computer program is stored. When the program is executed by a processor, the steps in the information reporting method described above or the data transmission method described above are implemented.

It can be understood that the embodiments described herein can be implemented by hardware, software, firmware, middleware, microcode, or a combination thereof. For hardware implementation, the processing unit can be implemented in one or more application specific integrated circuits (ASIC), digital signal processor (DSP), digital signal processing device (DSP Device, DSPD), programmable Logic device (PLD), Field-Programmable Gate Array (FPGA), general-purpose processors, controllers, microcontrollers, microprocessors, and other electronic units or combination thereof for performing the functions described above.

For software implementation, the technology described herein can be implemented by modules (such as procedures, functions, etc.) that perform the functions described herein. The software codes can be stored in the memory and executed by the processor. The memory can be implemented in the processor or external to the processor.

The various embodiments in this specification are described in a progressive manner. Each embodiment focuses on the differences from other embodiments, and the same or similar parts among the various embodiments can be referred to each other.

Those skilled in the art should understand that the embodiments of the present disclosure may be provided as methods, devices, or computer program products. Therefore, the embodiments of the present disclosure may adopt the form of a complete hardware embodiment, a complete software embodiment, or an embodiment combining software and hardware. Moreover, the embodiments of the present disclosure may adopt the form of a computer program product implemented on one or more computer-usable storage media (including but not limited to disk storage, CD-ROM, optical storage, etc.) containing computer-usable program codes.

The embodiments of the present disclosure are described with reference to the flowcharts and/or block diagrams of the methods, terminal devices (systems), and computer program products according to the embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processors of general-purpose computers, special-purpose computers, embedded processors, or other programmable data processing equipment to generate a machine, so that instructions executed by the processor of the computer or other programmable data processing equipment generate means for realizing the functions specified in one process or multiple processes in the flowchart and/or one block or multiple blocks in the block diagram.

These computer program instructions can also be stored in a computer-readable memory that can guide a computer or other programmable data processing equipment to work in a specific manner, so that the instructions stored in the computer-readable memory generates an article of manufacture including the instruction device. The instruction device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable data processing equipment to generate computer-implemented processing, so that the instructions executed on the above computer or other programmable equipment generate steps for implementing the functions specified in one process or multiple processes in the flowchart and/or one block or multiple blocks in the block diagram.

Although the optional embodiments of the present disclosure have been described, those skilled in the art can make additional changes and modifications to these embodiments once they learn the basic creative concept. Therefore, the appended claims are intended to be interpreted as including alternative embodiments and all changes and modifications, which all fall within the scope of the embodiments of the present disclosure.

It should also be noted that in this disclosure, relational terms such as first and second are only used to distinguish one entity or operation from another entity or operation, and do not necessarily require or imply that these entities or operations have any such actual relationship or order. Moreover, the terms "include", "comprise" or any other variants thereof are intended to cover non-exclusive inclusion, so that a process, method, article, or terminal device that includes a series of elements includes not only those elements, but also those that are not explicitly listed, or elements inherent to this process, method, article, or terminal device. If there are no more restrictions, the element defined by the sentence "including a . . . " does not exclude the existence of other same elements in the process, method, article or terminal device that includes the element.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information reporting method applied to a UE, comprising:
reporting first information to a network side device, wherein the first information indicates a downlink channel quality measurement;
wherein the first information indicates a first constraint relationship between times of repetition of NPRACH for each random access attempt and a first value; or indicates a second constraint relationship between maximum times of repetition for random access NPDCCH and a second value;

the first constraint relationship includes at least one of:
multiplying by the first value;
dividing by the first value;
adding the first value;
subtracting the first value, the second constraint relationship includes at least one of:
multiplying by the second value;
dividing by the second value;
adding the second value;
subtracting the second value,
wherein the first value and the second value are integers.

2. The information reporting method according to claim 1, wherein the first information includes N information units, wherein a first information unit represents no measurement report; a second information unit to an Nth information unit represent second information, and N is an integer greater than 1.

3. The information reporting method according to claim 2, wherein before the reporting first information to a network side device, the method further comprises:
determining repetition times information of NPDCCH transmission according to a SINR of a downlink channel; or
determining the repetition times information according to a bit error rate of NPDCCH.

4. The information reporting method according to claim 2, wherein the reporting first information to a network side device comprises at least one of:
reporting downlink channel quality information to the network side device by using a decoding method of uplink data;
reporting the downlink channel quality information to the network side device by using a scrambling method and/or a modulation and coding method and/or a time-frequency resource location used for sending uplink data;
reporting the downlink channel quality information to the network side device, and the downlink channel quality information being characterized by a bit field;
reporting the downlink channel quality information to the network side device by using third information and fourth information, wherein the third information indicates a part of the downlink channel quality information by bits, and the fourth information implicitly indicate the remaining part of the downlink channel quality information by using the scrambling method and/or the modulation and coding method and/or the time-frequency resource location used for sending uplink data; and
reporting the downlink channel quality information to the network side device by using the third information and fifth information, wherein the third information indicates a part of the downlink channel quality information by bits, and the fifth information implicitly indicates the remaining part of the downlink channel quality information by using a decoding method of the uplink data.

5. The information reporting method according to claim 2, wherein before the reporting first information to a network side device, the method further comprises:
acquiring a mapping relationship between downlink channel quality information and bit information issued by the network; or acquiring a mapping relationship between downlink channel quality information and bit information specified in a protocol; or
determining a mapping relationship between downlink channel quality information and bit information.

6. The information reporting method according to claim 1, wherein the first information indicates at least one of:
times of repetition of narrowband physical downlink control channel (NPDCCH);
a relationship between the repetition level of NPDCCH and times of repetition of NPRACH for each random access attempt;
a relationship between the repetition level of NPDCCH and a maximum times of repetition for random access to NPDCCH;
a range of the repetition level of NPDCCH;
a coverage enhancement level.

7. The information reporting method according to claim 6, wherein the repetition level of NPDCCH includes one of:
times of repetition of NPDCCH transmission;
a maximum times of repetition of NPDCCH transmission;
a minimum times of repetition of NPDCCH transmission.

8. The information reporting method according to claim 6, wherein the relationship between the repetition level of NPDCCH and the times of repetition of NPRACH for each random access attempt includes at least one of:
a difference relationship between the repetition level of NPDCCH and the times of repetition of NPRACH for each random access attempt;
a multiple relationship between the repetition level of NPDCCH and the times of repetition of NPRACH for each random access attempt.

9. The information reporting method according to claim 8, wherein the difference relationship between the repetition level of NPDCCH and the times of repetition of NPRACH for each random access attempt includes:
the difference relationship between the repetition level of NPDCCH and the times of repetition of NPRACH for each random access attempt includes first indication information, second indication information, and third indication information, the first indication information indicates the repetition level of NPDCCH is the same as the times of repetition of NPRACH for each random access attempt, the second indication information indicates that the repetition level of NPDCCH is greater than the times of repetition of NPRACH for each random access attempt, and the third indication information indicates that the repetition level of NPDCCH is less than the times of repetition of NPRACH for each random access attempt; or
the difference relationship between the repetition level of NPDCCH and the times of repetition of NPRACH for each random access attempt includes first indication information, second indication information, and third indication information, the first indication information indicates the repetition level of NPDCCH is the same as the times of repetition of NPRACH for each random access attempt, the second indication information indicates that the repetition level of NPDCCH is greater than the times of repetition of NPRACH for each random access attempt, and the third indication information indicates that the repetition level of NPDCCH is greater than times of repetition indicated by the second indication information.

10. The information reporting method according to claim 8, wherein the multiple relationship between the times of repetition level of PDCCH and the times of repetition of NPRACH for each random access attempt includes:
the multiple relationship between the repetition level of NPDCCH and the times of repetition of NPRACH for each random access attempt includes first indication information, second indication information, and third indication information, the first indication information indicates the repetition level of NPDCCH is the same as the times of repetition of NPRACH for each random access attempt, the second indication information indicates that the repetition level of NPDCCH is the times of repetition of NPRACH for each random access attempt multiplied by a third value, the third indication information indicates that the repetition level of NPDCCH is the times of repetition of NPRACH for each random access attempt multiplied by a fourth value, the third value is less than the fourth value, and the third and fourth values are integers; or
the multiple relationship between the repetition level of NPDCCH and the time of repetition of NPRACH for each random access attempt includes first indication information, second indication information, and third indication information, the first indication information indicates the repetition level of NPDCCH and the times of repetition of NPRACH for each random access attempt is the same, the second indication information indicates that the repetition level of NPDCCH is the times of repetition of NPRACH for each random access attempt multiplied by a fifth value, the third indication information indicates that the repetition level of the physical downlink control channel is the times of repetition of NPRACH for each random access attempt divided by a sixth value, and the fifth value and the sixth value are integers.

11. The information reporting method according to claim 6, wherein the relationship between the repetition level of NPDCCH and the maximum times of repetition for random access NPDCCH includes at least one of:
a difference relationship between the repetition level of NPDCCH and the maximum times of repetition for random access NPDCCH;
a multiple relationship between the repetition level of NPDCCH and the maximum times of repetition for random access NPDCCH.

12. The information reporting method according to claim 11, wherein the difference relationship between the repetition level of NPDCCH and the maximum times of repetition for random access NPDCCH includes:
the difference relationship between the repetition level of NPDCCH and the maximum times of repetition for random access to NPDCCH includes first indication information, second indication information, and third indication information, the first indication information indicates the repetition level of NPDCCH and the maximum times of repetition for random access NPDCCH are the same, the second indication information indicates that the repetition level of NPDCCH is greater than the maximum times of repetition for random access NPDCCH, and the third indication information indicates that the repetition level of NPDCCH is less than the maximum times of repetition for random access NPDCCH; or
the difference relationship between the repetition level of NPDCCH and the maximum times of repetition for random access NPDCCH includes first indication information, second indication information, and third indication information, the first indication information indicates the repetition level of NPDCCH and the maximum times of repetition for random access NPDCCH are the same, the second indication information indicates that the repetition level of NPDCCH is less than the maximum times of repetition for random access NPDCCH, and the third indication information indicates that the repetition level of NPDCCH is less than the times of repetition indicated in the second indication information; or
the difference relationship between the repetition level of NPDCCH and the maximum times of repetition for random access NPDCCH includes first indication information, second indication information, and third indication information, the first indication information indicates the repetition level of NPDCCH and the maximum times of repetition for random access NPDCCH are the same, the second indication information indicates that the repetition level of NPDCCH is greater than the maximum times of repetition for random access NPDCCH, and the third indication information indicates that the repetition level of NPDCCH is greater than the times of repetition indicated in the second indication information.

13. The information reporting method according to claim 12, wherein the maximum times of repetition for random access NPDCCH is:
a maximum number of repetitions for NPDCCH common search space for a random access response and/or MSG3 retransmission and/or MSG4.

14. The information reporting method according to claim 11, wherein the multiple relationship between the repetition level of NPDCCH and the maximum times of repetition for random access NPDCCH includes:
the multiple relationship between the repetition level of NPDCCH and the maximum times of repetition for random access NPDCCH includes first indication information, second indication information, and third indication information, the first indication information indicates the repetition level of NPDCCH and the maximum times of repetition for random access NPDCCH is the same, the second indication information indicates that the repetition level of NPDCCH is the maximum times of repetition for random access NPDCCH divided by a seventh value, the third indication information indicates that the repetition level of NPDCCH is the maximum times of repetition for random access NPDCCH divided by an eighth value, the seventh value is less than the eighth value, and the seventh and eighth values are integers; or
the multiple relationship between the repetition level of NPDCCH and the maximum times of repetition for random access NPDCCH includes first indication information, second indication information, and third indication information, the first indication information indicates the repetition level of NPDCCH and the maximum times of repetition for random access NPDCCH is the same, the second indication information indicates that the repetition level of NPDCCH is the maximum times of repetition for random access NPDCCH multiplied by a seventh value, the third indication information indicates that the repetition level of NPDCCH is the maximum times of repetition for random access NPDCCH multiplied by an eighth value, the seventh value is less than the eighth value, and the seventh and eighth values are integers; or
the multiple relationship between the repetition level of NPDCCH and the maximum times of repetition for random access NPDCCH includes first indication information, second indication information, and third indication information, the first indication information indicates the repetition level of NPDCCH and the maximum times of repetition for random access NPDCCH is the same, the second indication information indicates that the repetition level of NPDCCH is the maximum times of repetition for random access NPDCCH multiplied by a ninth value, the third indication information indicates that the repetition level of NPDCCH is the maximum times of repetition for random access NPDCCH divided by the tenth value, and the ninth value and the tenth value are integers.

15. The information reporting method according to claim 14, wherein the maximum times of repetition for random access to NPDCCH is:
a maximum number of repetitions for NPDCCH common search space for a random access response and/or MSG3 retransmission and/or MSG4.

16. The information reporting method according to claim 11, wherein the maximum times of repetition for random access NPDCCH is:
a maximum number of repetitions for NPDCCH common search space for a random access response and/or MSG3 retransmission and/or MSG4.

17. The information reporting method according to claim 6, wherein the maximum times of repetition for random access NPDCCH is:
a maximum number of repetitions for NPDCCH common search space for a random access response and/or MSG3 retransmission and/or MSG4.

18. A UE, comprising a processor, and a memory storing therein a computer program, wherein the computer program is executed by the processor so as to implement the information reporting method according to claim 1.

19. The information reporting method according to claim 1, wherein the maximum times of repetition for random access NPDCCH is:
a maximum number of repetitions for NPDCCH common search space for a random access response and/or MSG3 retransmission and/or MSG4.

20. A data transmission method applied to a network side device, comprising:
receiving first information reported by a UE, wherein the first information indicates a downlink channel quality measurement;
wherein the first information indicates a first constraint relationship between times of repetition of NPRACH for each random access attempt and a first value; or indicates a second constraint relationship between maximum times of repetition for random access NPDCCH and a second value;
the first constraint relationship includes at least one of:
multiplying by the first value;
dividing by the first value;
adding the first value;
subtracting the first value,
the second constraint relationship includes at least one of:
multiplying by the second value;
dividing by the second value;
adding the second value;
subtracting the second value,
wherein the first value and the second value are integers.

21. A network side device, comprising a processor, and a memory storing therein a computer program, wherein the computer program is executed by the processor so as to implement the data transmission method according to claim 20.

* * * * *